(12) United States Patent
Hoyzman et al.

(10) Patent No.: US 12,178,223 B2
(45) Date of Patent: Dec. 31, 2024

(54) INSECT LIFE CYCLE INTERRUPTION AGENT(LCIA) FORMULATIONS AND THEIR MANUFACTURE AND USE

(71) Applicant: BERGMAN INDUSTRIES LTD, Emeq Hefer Industrial Park (IL)

(72) Inventors: Anat Hoyzman, Petah Tikvah (IL); Yoav Blatt, Rehovot (IL); Ashgan Beshara, Tira (IL); Elisheva Ohana, Bat Yam (IL); Shimon Elmaliah, Moshav Aderet (IL); Udi Reiss, Moshav Hayogev (IL)

(73) Assignee: BERGMAN INDUSTRIES LTD, Emeq Hefer Industrial Park (IL)

( * ) Notice: Subject to any disclaimer, the term of this patent is extended or adjusted under 35 U.S.C. 154(b) by 0 days.

(21) Appl. No.: 18/022,042

(22) PCT Filed: Aug. 2, 2021

(86) PCT No.: PCT/IL2021/050933
§ 371 (c)(1),
(2) Date: Feb. 17, 2023

(87) PCT Pub. No.: WO2022/038592
PCT Pub. Date: Feb. 24, 2022

(65) Prior Publication Data
US 2023/0225368 A1    Jul. 20, 2023

(30) Foreign Application Priority Data

Aug. 18, 2020  (IL) .......................................... 276789
Mar. 30, 2021  (IL) .......................................... 281903

(51) Int. Cl.
*A23K 20/137* (2016.01)
*A23K 10/30* (2016.01)
(Continued)

(52) U.S. Cl.
CPC ............ *A23K 20/137* (2016.05); *A23K 10/30* (2016.05); *A23K 40/10* (2016.05); *A23K 40/35* (2016.05); *A23K 50/10* (2016.05); *A23K 50/75* (2016.05)

(58) Field of Classification Search
CPC ...... A23K 20/137; A23K 10/30; A23K 40/10; A23K 40/35; A23K 50/10; A23K 50/75;
(Continued)

(56) References Cited

U.S. PATENT DOCUMENTS 3,562,806 A    2/1971   Grant et al.
3,830,914 A    8/1974   Miller et al.
(Continued)

FOREIGN PATENT DOCUMENTS

CN       1444925 A      10/2003
CN    2018066957 U       6/2011
(Continued)

OTHER PUBLICATIONS

Baek et al., "Preparation and characterization of mucoadhesive enteric-coating ginsenoside-loaded microparticles", Arch. Pharm. Res. 2015;38(5):761-8., DOI 10.1007/s12272-014-0395-4—Abstract uploaded on May 13, 2014.
(Continued)

*Primary Examiner* — Savitha M Rao
*Assistant Examiner* — Andrew P Lee
(74) *Attorney, Agent, or Firm* — Roach Brown McCarthy & Gruber, P.C.; Kevin D. McCarthy

(57) ABSTRACT

An in-feed life cycle interruption agent (LCIA) including a granulated core comprising LCIA material and a coating on the core. Related methods and products are also disclosed. Examples of LCIA include, but are not limited to Naturally occurring insect toxins (NOIT such as saponin and Insect Growth Regulators (IFR) such as Cyromazine.

8 Claims, 4 Drawing Sheets

Figure 1:
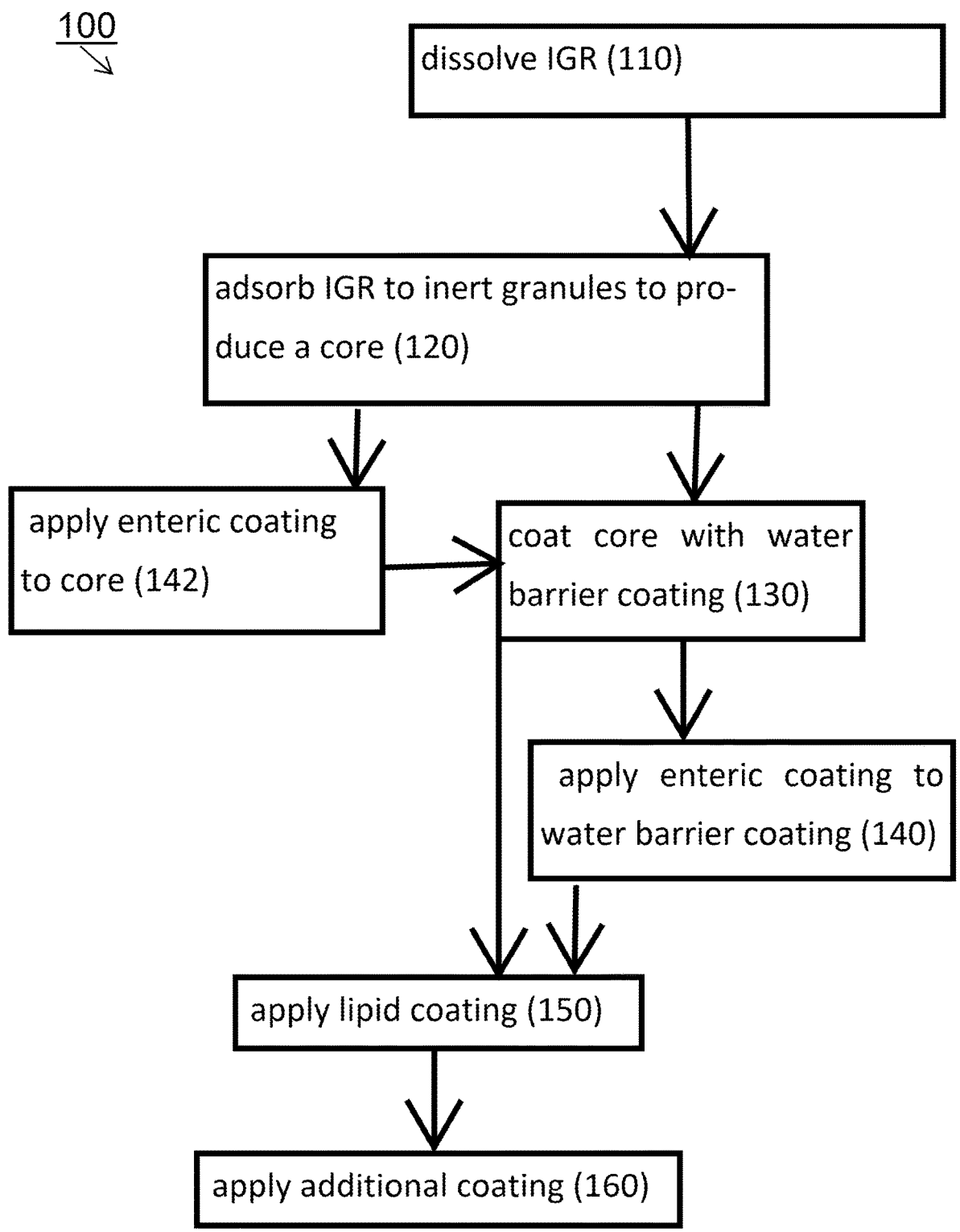

(51) Int. Cl.
    A23K 40/10      (2016.01)
    A23K 40/35      (2016.01)
    A23K 50/10      (2016.01)
    A23K 50/75      (2016.01)
(58) Field of Classification Search
    CPC .. A23K 20/105; A23K 20/111; A23K 20/121; A23K 20/158; A23K 20/163; A23K 20/184; A23K 20/28; A23K 40/30
    See application file for complete search history.

(56)                References Cited

U.S. PATENT DOCUMENTS

| | | | |
|---|---|---|---|
| 5,098,718 | A | 3/1992 | Ardaillon et al. |
| 5,290,557 | A | 3/1994 | Mason et al. |
| 5,639,794 | A | 6/1997 | Emerson et al. |
| 5,698,191 | A | 12/1997 | Wiersma et al. |
| 5,792,467 | A | 8/1998 | Emerson et al. |
| 7,846,463 | B2 | 12/2010 | Johal |
| 2014/0234386 | A1 | 8/2014 | Hunter et al. |
| 2017/0326195 | A1 | 11/2017 | Antony |
| 2018/0110218 | A1 | 4/2018 | Matteo Herrero |
| 2018/0368447 | A1 | 12/2018 | Bravo et al. |
| 2019/0150455 | A1 | 5/2019 | Silberstein et al. |
| 2019/0307156 | A1 | 10/2019 | Zasypkin et al. |
| 2020/0188468 | A1 | 6/2020 | Antony |

FOREIGN PATENT DOCUMENTS

| | | |
|---|---|---|
| CN | 102 579 536 A | 7/2012 |
| CN | 105746584 A | 7/2016 |
| CN | 108935929 A | 12/2018 |
| CN | 109452267 A | 3/2019 |
| KR | 20110026669 A | 3/2011 |
| WO | WO9639827 A1 | 12/1996 |
| WO | WO-2019209261 A1 * | 10/2019 |

OTHER PUBLICATIONS

Mahmoud Alagawany, et al., "Productive performance, egg quality, blood constituents, immune functions, and antioxidant parameters in laying hens fed diets with different levels of Yucca schidigera extract", Environ Sci Pollut Res Int. Apr. 2016; 23(7):6774-82, doi: 10.1007/s11356-015-5919-z, Epub Dec. 12, 2015 [Abstract].
Wang et al., "Effect of caprylic acid and Yucca schidigera extract on production performance, egg quality, blood characteristics, and excreta microflora in laying hens", Br. Poult. Sci., Dec. 2011; 52(6):711-7, doi: 10.1080/00071668.2011.635638 [Abstract].
Chalupa, "Rumen Bypass and Protection of Proteins and Amino Acids", Sep. 1975, J. Dairy Sci. 58(8):1198-1218.
Raja et al., "Evaluation of Larvicidal Activity of Sapindus Emargintus (Family: Sapindaceae) Leaf Extracts against the Housefly Larvae (*Musca domestica*) LINN", International Journal of Science and Research (IJSR), vol. 6, Issue 2, Feb. 2017, pp. 200-205.
Jiang et al., "Stability of saponin biopesticides: hydrolysis in aqueous solutions and lake waters", Environ Sci Process Impacts, Jul. 17, 2019, 21(7):1204-1214. doi: 10.1039/c9em00012g.
P.R. Cheeke, "Applications of saponins as feed additives in poultry production," In: Selle P, editor. Proceedings of 20th Annual Australian Poultry Science Symposium, Sydney (Australia): World's Poultry Science Association, Australian branch, pp. 50-55, Dec. 3, 2009.

Temiz, et al., "Encapsulation methods and use in animal nutrition", Selcuk J Agr Food Sci, (2018) 32 (3), 624-631, uploaded on Jan. 3, 2019.
Fernández-Pérez et al., "Controlled-release formulations of cyromazine-lignin matrix coated with ethylcellulose", J. Environ Sci Health B, Sep.-Oct. 2007, 42(7):863-8, doi:10.1080/03601230701555153, PMID: 17763045; Oct. 31, 2007 Abstract also uploaded.
Brake et al., "Retention of larvicidal activity after feeding cyromazine (Larvadex) for the initial 20 weeks of life of single comb white leghorn layers", Poult Sci. Sep. 1991; 70(9):1873-5. doi: 10.3382/ps.0701873. PMID: 1780256.
http://www.allaboutfeed.net/animal-feed/feed-additives/protecting-phytogenics-by-microencapsulation/anonymous, Apr. 9, 2010.
Anderson et al., "Intraruminal Controlled Release of Cyromazine for the Prevention of Lucilia cuprina myiasis in Sheep," Research in Veterinary Science, vol. 46, iss. 2, pp. 131-138 (Mar. 1989) [Abstract only].
Fernandez-Perez et al., "Controlled-release formulations of cyromazine-lignin matrix coated with ethylcellulose," Journal of Environmental Science and Health Part B, vol. 42, pp. 863-868 (2007), 7 pages.
Garrido-Herrera et al., "Controlled Release of Isoproturon, Imidacloprid, and Cyromazine from Alginate-Bentonite-Activated Carbon Formulations," Journal of Agriculture and Food Chemistry, vol. 54, No. 26, pp. 10053-10060 (2006), 9 pages.
Schwartz et al., "Controlled-Release Systems for the Delivery of Cyromazine into Water Surface," Journal of Agriculture and Food Chemistry, vol. 51, No. 20, pp. 5972-5976 (2003) [Abstract Only].
Tunaz et al., "Insect Growth Regulators for Insect Pest Control," Turk. J. Agric. For., vol. 28, pp. 377-387 (2004).
Uematsu et al. "Spectrophotometric Determination of Saponin in Yucca Extract Used as Food Additive"; Journal of AOAC International, (2000) vol. 83(6), 1451-1454 (4 pages).
Zoubiri et al.(2014), "Potentiality of plants as source of insecticide principles"; Journal of Saudi Chemical Society 18: 925-938 (14 pages).
Ashour et al. "A review on saponins from medicinal plants: chemistry, isolation, and determination"; Journal of Nanomedicine Research (2019) vol. 8 (1), 6-12 (7 pages).
Opender Koul (2016) The Handbook of Naturally Occurring Insecticidal Toxins Insect Biopesticide Research Centre, Jalandhar, India (6 pages—some abstracts).
Suke Dev and Opender Koul (2019) Insecticides of Natural Origin (abstract) (1 page).
Xia et al., Analysis of cyromazine in poultry feed using the QuEChERS method coupled with LC-MS/MS. J Agric Food Chem. May 26, 2010;58(10):5945-9. doi: 10.1021/jf9034282. PMID: 20155910 (6 pages).
Linda Propst, US Environmental Protection Agency, memorandum, EPA Reg. No. 100-ATR. Larvadex !% Pre-Mix (Cyromazine, CGA-72662), Amended registration request to increase the amount of active in the formulated product, Accession No. 265417, RCE 1749; https://www3.epa.gov/pesticides/chem_search/cleared_reviews/csr_PC121301_20-Jan-87_a.pdf (3 pages).
E. De Geyter et al.: "First Results on the Insecticidal Action of Saponins", Comm. Appl. Sci, Ghent University, vol. 72, No. 3, Jan. 1, 2007 (Jan. 1, 2007), pp. 645-648, XP055062502,* p. 648 (4 pages).
Gonzalez-Coloma, A. et al.: "Natural Product-Based Biopesticides for Insect Control",2013, XP055682661, Retrieved from the Internet: URL:http://dx.doi.org/10.1016/B978-0-12-40 9547-2.02770-0[retrieved on 2020] * p. 26-p. 27 (55 pages).

* cited by examiner

INSECT LIFE CYCLE INTERRUPTION AGENT(LCIA) FORMULATIONS AND THEIR MANUFACTURE AND USE

CROSS-REFERENCE TO RELATED APPLICATIONS

This is a National Stage Application filed under 35 U.S.C. 371 based on International Patent Application No. PCT/IL2021/050933, filed on Aug. 2, 2021, which claims priority under the Paris convention to Israeli Patent Application No. IL 276789, filed Aug. 18, 2020, and entitled "SAPONIN CONTAINING FEED ADDITIVES AND METHODS OF PRODUCING AND USING SAME"; and Israeli Patent Application No. IL 281903, filed Mar. 30, 2021, and entitled "PROTECTED INSECT GROWTH REGULATOR (IGR) FORMULATIONS AND THEIR MANUFACTURE AND USE". Each of these earlier applications is fully incorporated herein by reference.

FIELD OF THE INVENTION

The invention is in the field of insect control.

BACKGROUND OF THE INVENTION

Modern agriculture relies on high density production facilities. In many cases the production cycle is long and waste from livestock housed in the facility accumulates in the facility for long periods. The accumulated waste becomes a breeding ground for flies and other insects.

For example, laying hens are often housed for many months in a closed facility. In many cases waste is not removed from the facility during this entire period. Flies lay eggs in the waste. The eggs hatch into larva and the larva turn to pupa which mature into flies which then mate and lay more eggs. If the fly population is not controlled, conditions in the facility quickly become intolerable for animals and/or humans.

Current fly population control measures rely on chemical insecticides and/or traps.

Use of chemical insecticides in commercial agriculture is controversial due to concerns about the possibility of toxic residues in food products.

Cyromazine is a triazine insect growth regulator (IGR) used as an insecticide. It is a cyclopropyl derivative of melamine. Cyromazine interferes with the molting process of larvae and pupation.

IGR classes include chitin synthesis inhibitors, juvenile hormone mimics, juvenile hormone analogs, molting hormone agonists, molting hormone analogs and molting inhibitors.

Common chitin synthesis inhibitors include but are not limited to bistfluron, buprofezin, chlorfluazorun, Cyromazine, diflubenzuron, flucycloxuron, flufenoxuron, hexaflumuron, lufenuron, noyaluron, noyiflumuron, penfluron, teflubenzuron, and triflumuron.

Common juvenile hormone mimics include but are not limited to epofenonane, fenoxycarb, hydroprene, kinoprene, methoprene, pyriproxyfen, and triprene.

Common juvenile hormone analogs include but are not limited to juvenile hormone i, juvenile hormone ii, and juvenile hormone iii.

Common molting hormone agonists include but are not limited to chromafenozide, halofenozide, methoxyfenozide, and tebufenozide.

Common molting hormone analogs include but are not limited to α-ecdysone and ecdysterone.

Diofenolan is a common molting inhibitor.

In veterinary medicine, Cyromazine is used as an ectoparasiticide. In commercial agriculture, Cyromazine is sometimes included in livestock feed so that Cyromazine in fecal matter will contribute to insect control.

Cyromazine is digestible by many animals. Cyromazine is metabolized to melamine and melamine and/or Cyromazine can be detected in meat and/or eggs and/or milk of animals fed Cyromazine.

One commercially available Cyromazine product is LARVADEX. LARVADEX is supplied as a Cyromazine premix for inclusion in poultry feed. The LARVADEX label instruction call for inclusion of 5 grams of Cyromazine in 1000 Kg of feed. When used as directed, the concentration of Cyromazine in the feed is 5 PPM.

SUMMARY OF THE INVENTION

One aspect of some embodiments of the invention relates to insect life cycle interruption agents. For purposes of this specification and the accompanying claims, the term "life cycle interruption agent (LCIA)" indicates a material that reduces a rate of growth of a population of insects when present at or above a minimum effective concentration (MEC) in accumulated waste where insect eggs are normally deposited. According to various exemplary embodiments of the invention, LCIA interfere with reproduction and/or egg-hatch and/or molting from one stage to the next. Some, but not all, LCIA have larvicidal activity.

One aspect of some embodiments of the invention relates to a feed additive including enteric coated particles containing saponin. In some embodiments *Yucca* powder serves as a source of saponin. The enteric coating is formulated to allow the particles to pass through the digestive tract of livestock and be deposited in the waste without the saponin being inactivated and/or absorbed. In some embodiments the particles have a diameter range of 500 microns to 1400 microns with 1000 microns average diameter as determined by sieving through a series of sieves with decreasing mesh sizes. In some embodiments the saponin in the waste exert a larvastatic and/or larvicidal effect. Because waste is accumulating every day, the larvicide is applied automatically throughout the production cycle so long as the enteric coated particles containing saponin are present in the feed.

Another aspect of some embodiments of the invention relates to methods of manufacturing the enteric coated particles containing saponin. In some embodiments *Yucca* powder serves as a source of saponin. In some embodiments the manufacturing method includes wet granulation. According to various exemplary embodiments of the invention wet granulation formulations include *Yucca* powder and/or Cornstarch and/or maltodextrin and/or Carboxymethylcellulose (CMC) and/or sodium alginate. In other exemplary embodiments of the invention, a dry granulation is employed in a formulation which includes microcrystalline cellulose (MCC). Alternatively or additionally, in various embodiments the manufacturing process includes enteric coating by hydroxypropyl methylcellulose phthalate (HP-55) in an organic solution (e.g. acetone and/or methanol) or enteric coating by stearic acid.

Another aspect of some embodiments of the invention relates to using the animal as a vehicle to distribute the pest controlling material to the target area. The formulation of the saponin source in a way that prevent its inactivation is required as unprotected saponin is inactivated in the acidic portion of the digestive tract.

Another aspect of some embodiments of the invention relates to an additional coating that protects saponin from inactivation in the rumen.

For purposes of this specification and the accompanying claims, the term "saponin" is to be interpreted in its broadest possible scope so that it includes also derivatives and related compounds including but not limited to Triterpenoid Saponin, Triterpene saponin, Steroidal saponin, Steroid saponin, Oleanane-type triterpenoid saponin, Oleane-type saponin, Dioscin (a steroidal triterpene saponin), Lycyrrhizin, Oleanolic saponin, pentacyclic triterpenoid saponin, Monodesmosidic glucuronide saponin, Furostanol saponin, Spirostane-type saponin, Spirostanol Saponin, Cytotoxic Saponin, Molluscicidal saponin, Glucuronide Desacyljegosaponin, Desacylboninsaponin A, and Chikusetsusaponin V methyl ester.

Another aspect of some embodiments of the invention relates maintaining an effective level of an IGR to control flies in manure while reducing IGR residues in food products. In some embodiments the manure is poultry litter and the food product is eggs.

Another aspect of some embodiments of the invention relates to adsorption of an IGR on granulated particles of inert material (e.g. silicate). According to various exemplary embodiments of the invention the granulation is a wet process or a dry process.

Another aspect of some embodiments of the invention relates to encapsulation of an IGR with one or more coatings. In some embodiments the IGR to be coated is provided as granules. According to various exemplary embodiments of the invention the coatings include ethyl cellulose and/or an enteric coating (e.g. hydroxypropyl methylcellulose phthalate (HP-55)) and/or a saturated fat (e.g. hydrogenated palm oil) and/or another layer of ethyl cellulose. According to various exemplary embodiments of the invention 1, 2, 3 or 4 or more coatings are applied. In some embodiments the one or more coatings are applied to a core of IGR adsorbed on granulated silica or another inert material. In some embodiments the IGR is Cyromazine.

Still another aspect of some embodiments of the invention relates to use of less than 5 PPM of Cyromazine in poultry feed to effectively inhibit propagation of fly's larvae in poultry manure. According to various exemplary embodiments of the invention the feed contains 4 PPM of Cyromazine, 3 PPM of Cyromazine, 2 PPM of Cyromazine, 1 PPM of Cyromazine or intermediate or lower concentrations of Cyromazine.

Still another aspect of some embodiments of the invention relates to use of Naturally Occurring Insecticidal Toxins (NOIT) that are widely described in the literature (see for example: Opender Koul (2016) The Handbook of Naturally Occurring Insecticidal Toxins Insect Biopesticide Research Centre, Jalandhar, India and Zoubiri and Baaliouamer (2014), "Potentiality of plants as source of insecticide principles" Journal of Saudi Chemical Society 18: 925-938 and Suke Dev and Opender Koul (2019) Insecticides of Natural Origin; each of which is fully incorporated herein by reference).

Briefly, various NOIT are derived from plants and/or Microorganisms and/or Marine Organisms and/or Proteases. The following plant families are believed to be promising sources of NOIT: Annonaceae, Apocynaceae, Bignoneaceae, Cryptogams, Euphorbiaceae, Labiateae, Limiaceae, Moraceae, Pinaceae, Ranunculaceae, Rubiaceae, Solanaceae, Apiaceae, Asteraceae, Piperaceae, Cupressaceae, Fabaceae, Leguminosae, Meliaceae, Myrtaceae, Poaceae, Rosaceae, Rutaceae and Verbenaceae.

For purposes of this specification and the accompanying claims, the term "NOIT" includes, but is not limited to saponin (as defined herein) Steroidal aglycone, Steroidal glycosides, Bidentatoside, Gamboukokoensides A and B, Ginsenosides, glycosides of triterpenoid aglycones, hederagenincellobioside, oleanolic acid cellobioside, epihederagenincellobioside, gypsogenincellobioside, Triterpenoids, Cytotoxic pentacyclic triterpenes, Triterpene glycoside, Astersedifolioside A, B and C, Gypenosides, Sapogenol A and B, Polyhydroxyoleanene, Aesculiosides, Barringtosides A, B and C, ceposide A, ceposide B, and ceposide C, Furostanol glycosides, steroids of spirostan and furostan series, Seco-glycopyranosyl moiety, Triterpenicaglycone, and Triterpene glucosides. The term NOIT includes also versions of these compounds synthesized in a laboratory or factory.

It will be appreciated that the various aspects described above relate to solution of technical problems associated with controlling unwanted insect multiplication in an agricultural production facility.

Alternatively or additionally, it will be appreciated that the various aspects described above relate to solution of technical problems related to preventing pesticide residues from accumulating in livestock derived food products such as meat and eggs. In some embodiments using saponin from a natural source as an LCIA eliminates or reduces the need to use synthetic pesticides to prevent the growth of insects in the agricultural facility.

Alternatively or additionally, it will be appreciated that the various aspects described above relate to solution of technical problems associated with reducing unwanted residues of IGR and/or LCIA and its metabolites (e.g. Cyromazine and/or melamine) in food products.

Alternatively, or additionally, it will be appreciated that the various aspects described above relate to solution of technical problems related to preventing development of IGR/LCIA resistant strains of flies. In some embodiments a reduction in IGR/LCIA levels in manure contributes to prevention of development of IGR/LCIA resistant strains of flies.

In some exemplary embodiments of the invention there is provided an in-feed life cycle interruption agent (LCIA) including: (a) a granulated core including LCIA material; and (b) a coating on the core. In some embodiments, the LCIA material includes one or more Naturally Occurring Insecticidal Toxins (NOIT). According to various exemplary embodiments of the invention the NOIT includes at least one member of the group consisting of Saponin (as defined hereinabove), Steroidal aglycone, Steroidal glycosides, Bidentatoside, Gamboukokoensides A and B, Ginsenosides, glycosides of triterpenoid aglycones, hederagenincellobioside, oleanolic acid cellobioside, epihederagenincellobioside, gypsogenincellobioside, Triterpenoids, Cytotoxic pentacyclic triterpenes, Triterpene glycoside, Astersedifolioside A, B and C, Gypenosides, Sapogenol A and B, Polyhydroxyoleanene, Aesculiosides, Barringtosides A, B and C, ceposide A, ceposide B, and ceposide C, Furostanol glycosides, steroids of spirostan and furostan series, Seco-glycopyranosyl moiety, Triterpenicaglycone, and Triterpene glucosides. Alternatively or additionally, in some embodiments NOIT includes saponin. Alternatively or additionally, in some embodiments the LCIA material includes an insect growth regulator (IGR). Alternatively or additionally, in some embodiments the IGR includes one or more members of the group consisting of triazine compounds, chitin synthesis inhibitors, juvenile hormone mimics, juvenile hormone analogs, molting hormone agonists, molting hormone analogs, molting inhibitors and growth inhibitors which act by other mechanisms. Alternatively or additionally, in some embodiments the IGR includes Cyromazine. Alternatively or additionally, in some embodiments the coating includes an enteric coating that protects the NOIT from inactivation as the in-feed LCIA passes through the digestive tract. Alternatively or additionally, in some embodiments the in-feed LCIA includes at least 2% saponin by weight. Alternatively or additionally, in some embodiments the enteric coating includes hydroxypropyl methylcellulose phthalate (HP-55). Alternatively or additionally, in some embodiments the enteric coating includes stearic acid. Alternatively or additionally, in some embodiments the saponin includes *Yucca* derived material. Alternatively or additionally, in some embodiments the in-feed LCIA includes an additional coating that protects the LCIA from inactivation in a rumen. Alternatively or additionally, in some embodiments the additional coating includes fat. Alternatively or additionally, in some embodiments the additional coating includes at least one rumen stable cellulosic derivative. Alternatively or additionally, in some embodiments the additional coating includes zein, a hydrophobic substance, and an inorganic filler present in amounts that render the additional coating stable in the rumen. Alternatively or additionally, in some embodiments the granulated core includes one or more members of the group consisting of silica, microcrystalline cellulose, sugar, starch, calcium salts and other inert materials. Alternatively or additionally, in some embodiments the coating includes a water barrier coating including one or more members of the group consisting of ethyl cellulose, cellulose acetate, ethyl acrylate and methyl methacrylate. Alternatively or additionally, in some embodiments the in-feed LCIA includes an enteric coating on the water barrier coating. Alternatively or additionally, in some embodiments the in-feed LCIA includes an enteric coating under the water barrier coating. Alternatively or additionally, in some embodiments the enteric coating includes at least one member of the group consisting of hydroxypropyl methylcellulose phthalate (HP-55), Zein, cellulose acetate phthalate, cellulose acetate succinate, methacrylic polymer and shellac. Alternatively or additionally, in some embodiments the in-feed LCIA includes a coating including at least one member of the group consisting of a hard oil, a fat and a wax. Alternatively or additionally, in some embodiments the hard oil is made from one or more members of the group consisting of palm oil, palm kernel oil, coconut oil, rape seed oil, sunflower oil, corn oil, castor oil, Cocoa butter, Shea butter, butter, animal fat, and hydrogenated vegetable oils. Alternatively or additionally, in some embodiments the wax includes one or more members of the group consisting of carnauba wax and candelilla wax. Alternatively or additionally, in some embodiments the in-feed LCIA includes an additional coating including at least one member of the group consisting of ethyl cellulose, cellulose acetate, ethyl acrylate and methyl methacrylate.

In some Exemplary embodiments of the invention there is provided a method of producing an in-feed life cycle interruption agent (LCIA) including: (a) preparing a granulated core including LCIA material; and (b) applying a coating to the core that protects the LCIA material from inactivation and/or absorption during passage through the digestive tract. In some embodiments, the LCIA material includes one or more Naturally Occurring Insecticidal Toxins (NOIT). Alternatively or additionally, in some embodiments the NOIT includes at least one member of the group consisting of Saponin Steroidal aglycone, Steroidal glycosides, Bidentatoside, Gamboukokoensides A and B, Ginsenosides, glycosides of triterpenoid aglycones, hederagenincellobioside, oleanolic acid cellobioside, epihederagenincellobioside, gypsogenincellobioside, Triterpenoids, Cytotoxic pentacyclic triterpenes, Triterpene glycoside, Astersedifolioside A, B and C, Gypenosides, Sapogenol A and B, Polyhydroxyoleanene, Aesculiosides, Barringtosides A, B and C, ceposide A, ceposide B, and ceposide C, Furostanol glycosides, steroids of spirostan and furostan series, Seco-glycopyranosyl moiety, Triterpenicaglycone, and Triterpene glucosides. Alternatively or additionally, in some embodiments the NOIT includes saponin. Alternatively or additionally, in some embodiments the LCIA material includes an insect growth regulator (IGR). Alternatively or additionally, in some embodiments the IGR includes one or more members of the group consisting of triazine compounds, chitin synthesis inhibitors, juvenile hormone mimics, juvenile hormone analogs, molting hormone agonists, molting hormone analogs, molting inhibitors and growth inhibitors which act by other mechanisms. Alternatively or additionally, in some embodiments the IGR includes Cyromazine. Alternatively or additionally, in some embodiments the coating includes an enteric coating that protects the saponin from inactivation as the in-feed LCIA passes through the digestive tract. Alternatively or additionally, in some embodiments the core and the coating together comprise saponin (e.g. 2% saponin by weight). Alternatively or additionally, in some embodiments the enteric coating includes hydroxypropyl methylcellulose phthalate (HP-55). Alternatively or additionally, in some embodiments the enteric coating includes stearic acid. Alternatively or additionally, in some embodiments the saponin includes *Yucca* derived material. Alternatively or additionally, in some embodiments the method includes coating the core with an additional coating that protects the LCIA from inactivation in a rumen. Alternatively or additionally, in some embodiments the additional coating includes fat. Alternatively or additionally, in some embodiments the additional coating includes at least one rumen stable cellulosic derivative. Alternatively or additionally, in some embodiments the additional coating includes zein, a hydrophobic substance, and an inorganic filler present in amounts that render the additional coating stable in the rumen. Alternatively or additionally, in some embodiments the granulated core includes one or more members of the group consisting of silica, microcrystalline cellulose, sugar, starch, calcium salts and other inert materials. Alternatively or additionally, in some embodiments the coating includes a water barrier coating including one or more members of the group consisting of ethyl cellulose, cellulose acetate, ethyl acrylate and methyl methacrylate. Alternatively or additionally, in some embodiments the method includes adding an enteric coating on the water barrier coating. Alternatively or additionally, in some embodiments the method includes adding an enteric coating under the water barrier coating. Alternatively or additionally, in some embodiments the enteric coating includes at least one member of the group consisting of hydroxypropyl methylcellulose phthalate (HP-55), Zein, cellulose acetate phthalate, cellulose acetate succinate, methacrylic polymer and shellac. Alternatively or additionally, in some embodiments the method includes adding a coating including at least one member of the group consisting of a hard oil, a fat and a wax. Alternatively or additionally, in some embodiments the hard oil is made from one or more members of the group consisting of palm oil, palm kernel oil, coconut oil, rape seed oil, sunflower oil, corn oil, castor oil, Cocoa butter, Shea butter, butter, animal fat, and hydrogenated vegetable oils. Alternatively or additionally, in some embodiments the wax includes one or more members of the group consisting of carnauba wax and candelilla wax. Alternatively or additionally, in some embodiments the method includes applying an additional coating including at least one member of the group consisting of ethyl cellulose, cellulose acetate, ethyl acrylate and methyl methacrylate.

In some exemplary embodiments of the invention there is provided a method including: feeding livestock with a feed containing a coated LCIA at an effective concentration. In some embodiments, the livestock is poultry. Alternatively or additionally, in some embodiments the LCIA includes an IGR. Alternatively or additionally, in some embodiments the IGR includes Cyromazine. Alternatively or additionally, in some embodiments the LCIA includes an NOIT. Alternatively or additionally, in some embodiments the NOIT comprises at least one member of the group consisting of Saponin (as defined hereinabove), Steroidal aglycone, Steroidal glycosides, Bidentatoside, Gamboukokoensides A and B, Ginsenosides, glycosides of triterpenoid aglycones, hederagenincellobioside, oleanolic acid cellobioside, epihederagenincellobioside, gypsogenincellobioside, Triterpenoids, Cytotoxic pentacyclic triterpenes, Triterpene glycoside, Astersedifolioside A, B and C, Gypenosides, Sapogenol A and B, Polyhydroxyoleanene, Aesculiosides, Barringtosides A, B and C, ceposide A, ceposide B, and ceposide C, Furostanol glycosides, steroids of spirostan and furostan series, Seco-glycopyranosyl moiety, Triterpenicaglycone, and Triterpene glucosides. Alternatively or additionally, in some embodiments the NOIT includes Saponin.

In some exemplary embodiments of the invention there is provided a feed additive including: (a) a core including a source of one or more Naturally Occurring Insecticidal Toxins (NOIT) and adhesive materials; and (b) an enteric coating that protects saponin in the NOIT from inactivation as the feed additive passes through the digestive tract. In some embodiments, the NOIT includes at least one member of the group consisting of Saponin (as defined hereinabove) Steroidal aglycone, Steroidal glycosides, Bidentatoside, Gamboukokoensides A and B, Ginsenosides, glycosides of triterpenoid aglycones, hederagenincellobioside, oleanolic acid cellobioside, epihederagenincellobioside, gypsogenincellobioside, Triterpenoids, Cytotoxic pentacyclic triterpenes, Triterpene glycoside, Astersedifolioside A, B and C, Gypenosides, Sapogenol A and B, Polyhydroxyoleanene, Aesculiosides, Barringtosides A, B and C, ceposide A, ceposide B, and ceposide C, Furostanol glycosides, steroids of spirostan and furostan series, Seco-glycopyranosyl moiety, Triterpenicaglycone, and Triterpene glucosides. Alternatively or additionally, in some embodiments the NOIT includes saponin. Alternatively or additionally, in some embodiments the feed additive includes saponin. Alternatively or additionally, in some embodiments the feed additive includes at least 2% saponin by weight. Alternatively or additionally, in some embodiments the enteric coating includes hydroxypropyl methylcellulose phthalate (HP-55). Alternatively or additionally, in some embodiments the enteric coating includes stearic acid. Alternatively or additionally, in some embodiments the saponin source includes *Yucca* derived material. Alternatively or additionally, in some embodiments the feed additive includes an additional coating that protects saponin in the saponin source from inactivation in a rumen. Alternatively or additionally, in some embodiments the additional coating includes fat. Alternatively or additionally, in some embodiments the additional coating includes at least one rumen stable cellulosic derivative. Alternatively or additionally, in some embodiments the additional coating includes zein, a hydrophobic substance, and an inorganic filler present in amounts that render the additional coating stable in the rumen.

In some exemplary embodiments of the invention there is provided a method of producing a feed additive including: (a) preparing a core including a source of one or more Naturally Occurring Insecticidal Toxins (NOIT) and adhesive materials; and (b) applying an enteric coating to the core that protects saponin in the saponin source from inactivation as the saponin passes through the digestive tract. In some embodiments, the NOIT includes at least one member of the group consisting of Saponin (as defined hereinabove) Steroidal aglycone, Steroidal glycosides, Bidentatoside, Gamboukokoensides A and B, Ginsenosides, glycosides of triterpenoid aglycones, hederagenincellobioside, oleanolic acid cellobioside, epihederagenincellobioside, gypsogenincellobioside, Triterpenoids, Cytotoxic pentacyclic triterpenes, Triterpene glycoside, Astersedifolioside A, B and C, Gypenosides, Sapogenol A and B, Polyhydroxyoleanene, Aesculiosides, Barringtosides A, B and C, ceposide A, ceposide B, and ceposide C, Furostanol glycosides, steroids of spirostan and furostan series, Seco-glycopyranosyl moiety, Triterpenicaglycone, and Triterpene glucosides. Alternatively or additionally, in some embodiments the NOIT includes saponin. Alternatively or additionally, in some embodiments the preparing includes wet granulation. Alternatively or additionally, in some embodiments the preparing includes dry granulation. Alternatively or additionally, in some embodiments the enteric coating includes HP-55 (hydroxypropyl methylcellulose phthalate). Alternatively or additionally, in some embodiments the enteric coating includes stearic acid. Alternatively or additionally, in some embodiments the saponin source includes *Yucca* derived material. Alternatively or additionally, in some embodiments the method includes applying an additional coating that protects saponin in the saponin source from inactivation in a rumen. Alternatively or additionally, in some embodiments the additional coating includes a fat. Alternatively or additionally, in some embodiments the additional coating includes at least one rumen stable cellulosic derivative. Alternatively or additionally, in some embodiments the additional coating includes zein, a hydrophobic substance, and an inorganic filler present in amounts the render the additional coating stable in the rumen.

In some exemplary embodiments of the invention there is provided a method of producing a feed additive including: preparing a granulate including a source of one or more Naturally Occurring Insecticidal Toxins (NOIT) and adhesive materials including one or more alginates. In some embodiments, the NOIT includes at least one member of the group consisting of Saponin (as defined hereinabove) Steroidal aglycone, Steroidal glycosides, Bidentatoside, Gamboukokoensides A and B, Ginsenosides, glycosides of triterpenoid aglycones, hederagenincellobioside, oleanolic acid cellobioside, epihederagenincellobioside, gypsogenincellobioside, Triterpenoids, Cytotoxic pentacyclic triterpenes, Triterpene glycoside, Astersedifolioside A, B and C, Gypenosides, Sapogenol A and B, Polyhydroxyoleanene, Aesculiosides, Barringtosides A, B and C, ceposide A, ceposide B, and ceposide C, Furostanol glycosides, steroids of spirostan and furostan series, Seco-glycopyranosyl moiety, Triterpenicaglycone, and Triterpene glucosides. Alternatively or additionally, in some embodiments the NOIT includes saponin. Alternatively or additionally, in some embodiments the preparing includes wet granulation. Alternatively or additionally, in some embodiments the method includes applying an additional coating that protects saponin in the saponin source from inactivation in a rumen. Alternatively or additionally, in some embodiments the additional coating includes a fat. Alternatively or additionally, in some embodiments the additional coating includes at least one rumen stable cellulosic derivative. Alternatively or additionally, in some embodiments the additional coating includes zein, a hydrophobic substance, and an inorganic filler present in amounts the render the additional coating stable in the rumen.

In some exemplary embodiments of the invention there is provided an insect control method including: feeding livestock feed containing ≥100 PPM enteric coated saponin; wherein the enteric coated saponin are protected from inactivation as the saponin passes through the digestive tract.

In some exemplary embodiments of the invention there is provided a livestock feed including: conventional feed ingredients; and ≥100 PPM enteric coated saponin; wherein the enteric coated saponin are protected from inactivation as the saponin passes through the digestive tract.

In some exemplary embodiments of the invention there is provided poultry manure including conventional manure components and saponin. In some embodiments, a concentration of the saponin is ≥100 PPM.

In some exemplary embodiments of the invention there is provided an in-feed insect growth regulator (IGR) including: (a) a core including a granulated carrier and an IGR adsorbed thereto; and (b) a water barrier coating on the core. In some embodiments, the IGR includes one or more members of the group consisting of triazine compounds, chitin synthesis inhibitors, juvenile hormone mimics, juvenile hormone analogs, molting hormone agonists, molting hormone analogs, molting inhibitors and growth inhibitors which act by other mechanisms. Alternatively or additionally, in some embodiments the IGR includes Cyromazine.

Alternatively or additionally, in some embodiments the granulated carrier includes one or more members of the group consisting of silica, microcrystalline cellulose, sugar, starch, calcium salts and other inert materials. Alternatively or additionally, in some embodiments the water barrier coating includes one or more members of the group consisting of ethyl cellulose, cellulose acetate, ethyl acrylate and methyl methacrylate. Alternatively or additionally, in some embodiments the in-feed insect growth regulator includes an enteric coating on the water barrier coating. Alternatively or additionally, in some embodiments the in-feed insect growth regulator includes an enteric coating under the water barrier coating. Alternatively or additionally, in some embodiments the enteric coating includes at least one member of the group consisting of hydroxypropyl methylcellulose phthalate (HP-55), Zein, cellulose acetate phthalate, cellulose acetate succinate, methacrylic polymer and shellac. Alternatively or additionally, in some embodiments the in-feed insect growth regulator includes a coating including at least one member of the group consisting of a hard oil, a fat and a wax. Alternatively or additionally, in some embodiments the hard oil is made from one or more members of the group consisting of palm oil, palm kernel oil, coconut oil, rape seed oil, sunflower oil, corn oil, castor oil, Cocoa butter, Shea butter, butter, animal fat, and hydrogenated vegetable oils. Alternatively or additionally, in some embodiments the wax includes one or more members of the group consisting of carnauba wax and candelilla wax. Alternatively or additionally, in some embodiments the in-feed insect growth regulator includes an additional coating including at least one member of the group consisting of ethyl cellulose, cellulose acetate, ethyl acrylate and methyl methacrylate.

In some exemplary embodiments of the invention there is provided an animal feed including an in-feed insect growth regulators set forth hereinabove, the animal feed having a Cyromazine concentration of 0.5 PPM to 5 PPM.

In some exemplary embodiments of the invention there is provided a method including: (a) dissolving an IGR and adsorbing the IGR to inert granules to produce a core; and (b) coating the core with a water barrier coating. In some embodiments, the IGR includes one or more members of the group consisting of triazine compounds, chitin synthesis inhibitors, juvenile hormone mimics, juvenile hormone analogs, molting hormone agonists, molting hormone analogs, molting inhibitors and growth inhibitors which act by other mechanisms. Alternatively or additionally, in some embodiments the IGR includes Cyromazine. Alternatively or additionally, in some embodiments the inert granules include one or more members of the group consisting of silica, microcrystalline cellulose, sugar, starch, calcium salts and other inert materials. Alternatively or additionally, in some embodiments the water barrier coating includes one or more members of the group consisting of ethyl cellulose, cellulose acetate, ethyl acrylate and methyl methacrylate. Alternatively or additionally, in some embodiments method includes applying an enteric coating to the water barrier coating. Alternatively or additionally, in some embodiments method includes applying an enteric coating to core prior to coating the core with the water barrier coating. Alternatively or additionally, in some embodiments the enteric coating includes at least one member of the group consisting of hydroxypropyl methylcellulose phthalate (HP-55), Zein, cellulose acetate phthalate, cellulose acetate succinate, methacrylic polymer and shellac. Alternatively or additionally, in some embodiments method includes applying a lipid coating. Alternatively or additionally, in some embodiments method includes applying an additional coating including one or more members of the group consisting of ethyl cellulose, ethyl acrylate and methyl methacrylate. Alternatively or additionally, in some embodiments the applying employs fluid bed encapsulation. Alternatively or additionally, in some embodiments the coating employs fluid bed encapsulation.

In some exemplary embodiments of the invention there is provided a method of insect control including: (a) preparing animal feed with a Cyromazine concentration of 3.5 PPM or less; and (b) feeding animals with the feed.

In some exemplary embodiments of the invention there is provided a method including: (a) feeding laying hens with feed containing 5 PPM of Cyromazine to produce eggs; and (b) harvesting the eggs with a Cyromazine concentration of 0.065 mg/kg or less.

In some exemplary embodiments of the invention there is provided a method including: (a) feeding laying hens with feed containing 1.0 PPM or more of Cyromazine to produce eggs; and (b) harvesting the eggs with a Cyromazine concentration of 0.01 mg/kg or less.

Some exemplary embodiments of the invention relate to use of a domestic animal to distribute an insect life cycle interruption agent (LCIA) in its environment via its waste, wherein the LCIA is not Cyromazine. In some embodiments, LCIA includes one or more Naturally Occurring Insecticidal Toxins (NOIT) and/or one or more insect growth regulators (IGRs). Alternatively or additionally, in some embodiments the domestic animal is a bird.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

For purposes of this specification and the accompanying claims, the terms "encapsulated", "protected" and "enteric coated" are used interchangeably. It is noted that although these terms are common in the nutritional literature their meaning varies widely. In this application it is demonstrated experimentally that >150 PPM of enteric coated saponin feed produces larvicidal effect similar to >150 PPM of saponin in manure.

Percentages (%) of chemicals and/or ingredients are W/W (weight per weight) unless otherwise indicated.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIG. 1 is a simplified flow diagram of a method according to some exemplary embodiments of the invention;

FIG. 2 is a simplified flow diagram of a method according to additional exemplary embodiments of the invention;

FIG. 3A is a simplified flow diagram of a method according to further additional exemplary embodiments of the invention;

FIG. 3B is a simplified flow diagram of a method according to still further additional exemplary embodiments of the invention;

FIG. 4 is a plot of Cyromazine concentration in eggs (mg/kg) as a function of Cyromazine concentration in feed (PPM).

DETAILED DESCRIPTION OF EMBODIMENTS

Embodiments of the invention relate to insect life cycle interruption agents (LCIA) and methods of making and using them as well as to feeds which contain them. LCIA includes, for example, Naturally occurring insect toxins (NOIT) such as saponin and/or in feed insect growth regulators (IGR) such as Cyromazine.

Specifically, some embodiments of the invention can be used to reduce the amount of LCIA (e.g. IGR or NOIT) absorbed by an animal consuming feed containing the LCIA. In some embodiments this contributes to a reduction in LCIA concentration in food products such as eggs.

The principles and operation of LCIA used in-feed and/or methods according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and does not limit the scope of the invention which is defined solely by the claims.

Exemplary In-Feed LCIA

In some exemplary embodiments of the invention there is provided an in-feed life cycle interruption agent (LCIA) including a granulated core containing LCIA material and a coating on the Core. According to various exemplary embodiments of the invention the LCIA material includes an insect growth regulator (IGR) and/or a Naturally Occurring Insecticidal Toxins (NOIT). Saponin is one example of a NOIT. According to various exemplary embodiments of the invention the IGR includes one or more members of the group consisting of triazine compounds, chitin synthesis inhibitors, juvenile hormone mimics, juvenile hormone analogs, molting hormone agonists, molting hormone analogs, molting inhibitors and growth inhibitors which act by other mechanisms. In some embodiments the IGR includes Cyromazine. Alternatively or additionally, in some embodiments the coating includes an enteric coating that protects the saponin from inactivation as the in-feed LCIA passes through the digestive tract. In some embodiments the in-feed LCIA includes at least 2% saponin by weight. In some embodiments the in-feed LCIA is mixed with feed ingredients to give a final concentration of 150 PPM, 200 PPM, 300 PPM, 350 PPM, 500 PPM, 450 PPM, 500 PPM or intermediate or higher concentrations of saponin in the feed. Alternatively or additionally, in some embodiments the enteric coating includes hydroxypropyl methylcellulose phthalate (HP-55) and/or stearic acid. Alternatively or additionally, in some embodiments the saponin includes *Yucca* derived material.

Alternatively or additionally, in some embodiments the in-feed LCIA includes an additional coating that protects the LCIA from inactivation in a rumen. In some embodiments the additional coating includes fat and/or at least one rumen stable cellulosic derivative and/or includes zein, a hydrophobic substance, and an inorganic filler present in amounts that render the additional coating stable in the rumen.

Alternatively or additionally, in some embodiments the granulated core includes one or more members of the group consisting of silica, microcrystalline cellulose, sugar, starch, calcium salts and other inert materials. Alternatively or additionally, in some embodiments the coating includes a water barrier coating including one or more members of the group consisting of ethyl cellulose, cellulose acetate, ethyl acrylate and methyl methacrylate. In some embodiments the in-feed LCIA according includes an enteric coating on the water barrier coating and/or an enteric coating under the water barrier coating. In some embodiments the enteric coating includes at least one member of the group consisting of hydroxypropyl methylcellulose phthalate (HP-55), Zein, cellulose acetate phthalate, cellulose acetate succinate, methacrylic polymer and shellac.

Alternatively or additionally, in some embodiments the in-feed LCIA has a coating including at least one member of the group consisting of a hard oil, a fat and a wax. According to various exemplary embodiments of the invention the hard oil is made from one or more members of the group consisting of palm oil, palm kernel oil, coconut oil, rape seed oil, sunflower oil, corn oil, castor oil, Cocoa butter, Shea butter, butter, animal fat, and hydrogenated vegetable oils. Alternatively or additionally, according to various exemplary embodiments of the invention the wax includes one or more members of the group consisting of carnauba wax and candelilla wax.

Alternatively or additionally, in some embodiments the in-feed LCIA according to any includes an additional coating with at least one member of the group consisting of ethyl cellulose, cellulose acetate, ethyl acrylate and methyl methacrylate.

Exemplary Production Method: In-Feed Life Cycle Interruption Agent (LCIA)

In some exemplary embodiments of the invention there is provided a method of producing an in-feed life cycle interruption agent (LCIA) including preparing a granulated core including LCIA material and applying a coating to said core that protects the LCIA material from inactivation during passage through the digestive tract. According to various exemplary embodiments of the invention the LCIA material includes a Naturally Occurring Insecticidal Toxins (NOIT) and/or an insect growth regulator (IGR). Saponinn is one example of an NOIT. According to various exemplary embodiments of the invention the IGR includes one or more members of the group consisting of triazine compounds, chitin synthesis inhibitors, juvenile hormone mimics, juvenile hormone analogs, molting hormone agonists, molting hormone analogs, molting inhibitors and growth inhibitors which act by other mechanisms. In some embodiments the IGR includes Cyromazine. In some embodiments the coating includes an enteric coating that protects the saponin from inactivation as the in-feed LCIA passes through the digestive tract. In some embodiments the core and the coating together comprise at least 2% saponin by weight. Alternatively or additionally, in some embodiments the enteric coating includes hydroxypropyl methylcellulose phthalate (HP-55). Alternatively or additionally, in some embodiments the enteric coating includes stearic acid. Alternatively or additionally, in some embodiments the saponin includes *Yucca* derived material.

In some exemplary embodiments of the invention, the method includes coating the core with an additional coating that protects the LCIA from inactivation in a rumen. In some embodiments the additional coating includes fat and/or at least one rumen stable cellulosic derivative and/or includes zein, a hydrophobic substance, and an inorganic filler present in amounts that render the additional coating stable in the rumen.

In some exemplary embodiments of the invention, the granulated core includes one or more members of the group consisting of silica, microcrystalline cellulose, sugar, starch, calcium salts and other inert materials.

In some embodiments the coating comprises a water barrier coating including one or more members of the group consisting of ethyl cellulose, cellulose acetate, ethyl acrylate and methyl methacrylate.

In some embodiments the method includes adding an enteric coating on the water barrier coating and/or under the water barrier coating.

According to various exemplary embodiments of the invention the enteric coating includes at least one member of the group consisting of hydroxypropyl methylcellulose phthalate (HP-55), Zein, cellulose acetate phthalate, cellulose acetate succinate, methacrylic polymer and shellac.

In some embodiments the method includes adding a coating including at least one member of the group consisting of a hard oil, a fat and a wax. According to various exemplary embodiments of the invention the hard oil is made from one or more members of the group consisting of palm oil, palm kernel oil, coconut oil, rape seed oil, sunflower oil, corn oil, castor oil, Cocoa butter, Shea butter, butter, animal fat, and hydrogenated vegetable oils. Alternatively or additionally, according to various exemplary embodiments of the invention the wax includes one or more members of the group consisting of carnauba wax and candelilla wax.

In some exemplary embodiments of the invention, the method includes applying an additional coating including at least one member of the group consisting of ethyl cellulose, cellulose acetate, ethyl acrylate and methyl methacrylate.

Exemplary Method of Coated LCIA Use

In some exemplary embodiments of the invention there is provided an insect control method including feeding livestock with a feed containing a coated LCIA at an effective concentration. For purposes of this specification and the accompanying claims, the term "effective concentration" indicates an amount which interrupts the lifecycle of an insect, such as a fly, when the insect contacts or ingests the material. In some embodiments the concentration in feed is different than the concentration in livestock waste. In such cases the effective concentration in feed indicates an amount that will provide an effective concentration in the waste. In some embodiments the livestock is poultry. Alternatively or additionally, in some embodiments the LCIA includes an IGR, for example Cyromazine or another IGR as set forth hereinabove. Alternatively or additionally, in some embodiments the LCIA includes an NOIT, for example Saponin or another NOIT as set forth hereinbelow in "Exemplary use of Naturally Occurring Insecticidal Toxins (NOIT)". Relevant coating materials and coating processes are described hereinabove and hereinbelow.

Exemplary Feed Additive

In some exemplary embodiments of the invention there is provided a feed additive including a core which contains one or more Naturally Occurring Insecticidal Toxins (NOIT) and adhesive materials and an enteric coating that protects the NOIT from inactivation as the feed additive passes through the digestive tract. According to various exemplary embodiments of the invention the NOIT includes at least one member of the group consisting of Saponin (as defined herein), Steroidal aglycone, Steroidal glycosides, Bidentatoside, Gamboukokoensides A and B, Ginsenosides, glycosides of triterpenoid aglycones, hederagenincellobioside, oleanolic acid cellobioside, epihederagenincellobioside, gypsogenincellobioside, Triterpenoids, Cytotoxic pentacyclic triterpenes, Triterpene glycoside, Astersedifolioside A, B and C, Gypenosides, Sapogenol A and B, Polyhydroxyoleanene, Aesculiosides, Barringtosides A, B and C, ceposide A, ceposide B, and ceposide C, Furostanol glycosides, steroids of spirostan and furostan series, Seco-glycopyranosyl moiety, Triterpenicaglycone, and Triterpene glucosides. In some exemplary embodiments of the invention, the NOIT includes Saponin. According to various exemplary embodiments of the invention the feed additive includes at least 2% saponin by weight, at least 3% saponin by weight, at least 4% saponin by weight, at least 5% saponin by weight, at least 6% saponin by weight, at least 7% saponin by weight, at least 8% saponin by weight, at least 9% saponin by weight, at least 10% saponin by weight or intermediate or greater percentages of saponin. Alternatively or additionally, in some embodiments the enteric coating includes hydroxypropyl methylcellulose phthalate (HP-55). Alternatively or additionally, in some embodiments the enteric coating includes stearic acid. Alternatively or additionally, according to various exemplary embodiments of the invention the enteric coating includes Hydroxypropyl methylcellulose acetate succinate and/or Sodium Alginate and/or calcium Alginate and/or Zein and/or Shellac (esters of aleuritic acid) and/or Cellulose acetate phthalate (CAP) and/or Poly(methacrylic acid-co-methyl methacrylate) and/or Cellulose acetate trimellitate (CAT) and/or Poly(vinyl acetate phthalate) (PVAP).

In some exemplary embodiments of the invention, the saponin source includes *Yucca* derived material. In some exemplary embodiments of the invention, *Yucca* derived mater is employed as a saponin source because it is commonly employed as an ingredient in commercial feed formulations and/or because it is commercially available in a stable form and/or because it contains a relatively high level of saponin in dry powder form (typically 8% to 12%) and/or because its price makes it feasible to include in the required amounts. Alternatively or additionally, because *Yucca* powder is routinely used in commercial feed preparation, there is no problem with toxicity and/or regulatory approval. Similar considerations apply to other natural saponin sources, such as *Tribulus, Zygophyllum coccineum, Gymnema sylvestre, Achyranthes aspera, Acalypha indica, Balanites aegyptiaca, Quillaja saponaria* bark and *Barbarea vulgaris.*

Feed additives described hereinabove in this section are suitable for use in monogastric animals, including but not limited to poultry.

In some exemplary embodiments of the invention, an additional coating that protects saponin in the saponin source from inactivation in a rumen is employed. The additional coating renders the feed additive suitable for use in ruminants such as cattle (dairy or beef), sheep and goats.

Exemplary Additional Coatings

In some exemplary embodiments of the invention, the additional coating includes a fat (e.g. tristearin). In some embodiments the fat is formulated with colloidal kaolin and/or liquid unsaturated fatty acid. Additional coatings of this type are known to impart protection to a core which they coat in the rumen (W. Chalupa (1975) J. Dairy Sci. 58(8): 1198-12-18). The Chalupa article is both well known to those of ordinary skill in the art and fully incorporated herein by reference.

Alternatively or additionally, in some embodiments the additional coating includes at least one rumen stable cellulosic derivative. In some embodiments the derivative is a nitrogen containing derivative. Rumen stable nitrogen-containing cellulosic derivatives and their use in feed and/or feed additive formulation are described in U.S. Pat. No. 3,562,806 which is both well known to those of skill in the art and fully incorporated herein by reference. Briefly, rumen stable nitrogen-containing cellulosic derivatives are produced by reaction of unsaturated derivative of cellulose with an organic base containing at least one H—N group in its molecule. According to various exemplary embodiments of the invention the unsaturated cellulose derivatives are selected from the group consisting of unsaturated cellulose esters, unsaturated cellulose ethers, and unsaturated cellulosic mixed ether-esters.

Alternatively or additionally, in some embodiments additional coating includes zein, a hydrophobic substance and an inorganic filler present in amounts that render the additional coating stable in the rumen. Optionally, the additional coating includes a non-water-soluble polymer in an amount that a combination of the four ingredients is stable in the rumen. U.S. Pat. No. 5,098,718, which is both well known to those of skill in the art and fully incorporated herein by reference, describes additional coatings of this type in detail.

Exemplary Production Method

In some exemplary embodiments of the invention there is provided a method of producing a feed additive. The method includes preparing a core including a source of one or more Naturally Occurring Insecticidal Toxins (NOIT) and adhesive materials and applying an enteric coating that protects the NOIT from inactivation as the NOIT passes through the digestive tract. According to various exemplary embodiments of the invention preparing includes wet granulation and/or dry granulation. In some exemplary embodiments of the invention, the enteric coating includes HP-55 (hydroxypropyl methylcellulose phthalate). Alternatively or additionally, in some embodiments the enteric coating comprises stearic acid. According to various exemplary embodiments of the invention said NOIT may comprises one member of the group consisting of Saponin (as defined herein), Steroidal aglycone, Steroidal glycosides, Bidentatoside, Gamboukokoensides A and B, Ginsenosides, glycosides of triterpenoid aglycones, hederagenincellobioside, oleanolic acid cellobioside, epihederagenincellobioside, gypsogenincellobioside, Triterpenoids, Cytotoxic pentacyclic triterpenes, Triterpene glycoside, Astersedifolioside A, B and C, Gypenosides, Sapogenol A and B, Polyhydroxyoleanene, Aesculiosides, Barringtosides A, B and C, ceposide A, ceposide B, and ceposide C, Furostanol glycosides, steroids of spirostan and furostan series, Seco-glycopyranosyl moiety, Triterpenicaglycone, and Triterpene glucosides. In some embodiments the NOIT includes Saponin. Alternatively or additionally, in some embodiments the saponin source includes *Yucca* derived material. In some exemplary embodiments of the invention, the method includes applying an additional coating that protects saponin in the saponin source from inactivation in a rumen. According to various exemplary embodiments of the invention the additional coating is as described hereinabove under "Exemplary additional coatings".

Additional Exemplary Production Method

In some exemplary embodiments of the invention there is provided a method of producing a feed additive including preparing a granulate including a source of one or more Naturally Occurring Insecticidal Toxins (NOIT) and adhesive materials including one or more alginates. According to these embodiments the one or more alginates provide enteric protection to the NOIT in the NOIT source. The enteric protection reduces or eliminates inactivation of the NOIT as it passes through the digestive tract. In some embodiments the preparing includes wet granulation. According to various exemplary embodiments of the invention the NOIT includes at least one member of the group consisting of Saponin (as defined herein), Steroidal aglycone, Steroidal glycosides, Bidentatoside, Gamboukokoensides A and B, Ginsenosides, glycosides of triterpenoid aglycones, hederagenincellobioside, oleanolic acid cellobioside, epihederagenincellobioside, gypsogenincellobioside, Triterpenoids, Cytotoxic pentacyclic triterpenes, Triterpene glycoside, Astersedifolioside A, B and C, Gypenosides, Sapogenol A and B, Polyhydroxyoleanene, Aesculiosides, Barringtosides A, B and C, ceposide A, ceposide B, and ceposide C, Furostanol glycosides, steroids of spirostan and furostan series, Seco-glycopyranosyl moiety, Triterpenicaglycone, and Triterpene glucosides. In some embodiments the NOIT includes saponin.

In some exemplary embodiments of the invention, the method includes applying an additional coating that protects saponin in the saponin source from inactivation in a rumen. According to various exemplary embodiments of the invention the additional coating is as described hereinabove under "Exemplary additional coatings".

Exemplary Insect Control Method

In some exemplary embodiments of the invention there is provided an insect control method including feeding livestock feed containing ≥100 PPM enteric coated saponin. According to various exemplary embodiments of the invention the concentration of saponin in the feed additive is ≥100 PPM, ≥150 PPM, ≥200 PPM, ≥250 PPM, ≥300 PPM, ≥400 PPM, ≥500 PPM, ≥600 PPM or intermediate or higher concentrations.

According to the method, the enteric coated saponin are protected from inactivation as the saponin passes through the digestive tract. As demonstrated in experimental examples hereinbelow, saponin in manure have a dramatic larvicidal effect starting at a concentration of 100 ppm or 200 ppm in manure. This corresponds to a 100 ppm to 200 ppm concentration of encapsulated saponin in the feed. While the experimental examples were performed on laying hens, it is expected that similar results can be achieved with other types of poultry including but not limited to broilers, turkeys, ducks and geese. Mention livestock may be poultry such as chickens, turkeys or ducks. Further, it is expected that similar results can be achieved with other monogastric animals such as swine, rabbits, horses, dogs or rodents.

Alternatively or additionally, by adding an additional coating that protects the saponin from degradation in a rumen, it is expected that similar results can be achieved with ruminants such as cattle sheep and goats.

Exemplary Livestock Feed

In some exemplary embodiments of the invention there is provided a livestock feed including: conventional feed ingredients and ≥100 PPM enteric coated saponin. As described hereinabove and demonstrated in examples hereinbelow, the enteric coated saponin are protected from inactivation as the saponin passes through the digestive tract.

It is expected that during the life of this patent many saponin sources and/or enteric coating materials will be developed and the scope of the invention is includes all such new technologies a priori.

Alternatively or additionally, it is expected that during the life of this patent many additional coating types will be developed and the scope of the invention is includes all such new technologies a priori.

Exemplary Larvicidal Manure

In some exemplary embodiments of the invention there is provided poultry manure including: conventional manure components and ≥100 PPM saponin.

Assaying Saponin Concentration

Percentages of saponin are assayed by a spectrophotometric assay as set forth here.

The spectrophotometric assay gives a total saponin content. This method is robust and easy for quantification of saponin in plant extracts and feeds. It requires only common solvents to extract the saponins plant material such as *yucca* powder or from premixes or feeds. The method is set forth briefly and additional details are available in *Journal of AOAC International*, (2000) Vol 83(6), 1451-1454 and in *Journal of Nanomedicine Research* (2019) Vol 8 (1), 6-12 each of which is widely known and each of which is fully incorporated herein by reference.

Initially saponin is extracted into a water/ethanol mixture. The ethanol is removed by evaporation and saponins are back extracted from the water phase into 3 aliquots of n-butanol. The combined n-butanol fraction is evaporated to dryness at 90° C. The extract is the purified with HP-20 resin and saponin fraction is eluted by 95% methanol solution.

The methanol eluate containing saponin is then concentrated by evaporation of methanol and hydrolyzed with a mixture of HCl 2M/ethanol (1:1) to produce two fractions: a sapogenin (steroid) and a sugar moiety.

The sapogenin is extracted with diethyl ether and dehydrated with sodium sulfate. The ether is evaporated and the remaining residue is dissolved in ethyl acetate for spectrophotometric assay.

P-anisaldehyde and sulfuric acid are used as reagent for color development. Sapogenin extract, standard (Sarasapogenin from Sigma-Aldrich) and blank (Ethyl acetate) are simultaneously incubated at 60° C. in a shaking water bath with the color development reagents. After cooling, absorbance is measured at 430 nm and the total saponin content is then expressed in mg of standard equivalents per gram of sample.

It is believed that the lowest detectable level of saponin with this assay is 1 PPM.

Direct assays of saponin in dried ground manure are believed to be possible but have not yet been performed.

Exemplary Theoretical Calculation of Degree of Saponin Protection

Using the % of feed digestibility in layers (which is a known quantity) it is possible to estimate the amount of excrement per unit feed consumed. If the amount of Saponin in the feed is known, the amount of saponin in manure can be calculated.

The calculation for a 100 ppm dose of saponin in feed is as follows:

A laying hen consumes approximately 120 gr of feed per day containing 0.012 gr saponin (100 ppm). The feed contains about 10% moisture. Roughly 40% of the dry matter in feed is excreted meaning about 43 gram of dry matter excreted. The manure contains roughly 65% moisture. This means 43 gram of dry matter from feed is about 35% of the wet manure. The amount of manure that 1 bird excreted per day is about 123 gr of wet material (dry matter+moisture). Assuming that the excreta contains all the saponin originally present in the feed that the hen consumed, 0.012 gr, it means the excreta contains 0.01% saponin or 100 mg/kg of wet manure. This corresponds to 100 PPM on a wet basis or about 285 ppm on a dry matter basis.

This calculation was based on conjecture as it is unknown how much of the encapsulated saponin granules stay intact after the passage through the digestive system. Results presented in examples 6 through 10 show that this conjecture was correct.

Exemplary In-Feed Insect Growth Regulators (IGR)

Some exemplary embodiments of the invention relate to an in-feed insect growth regulators (IGR) including a core having a granulated carrier and one or more IGRs adsorbed on the carrier and a water barrier coating on the core. According to various exemplary embodiments of the invention the IGR includes one or more members of the group consisting of triazine compounds, chitin synthesis inhibitors, juvenile hormone mimics, juvenile hormone analogs, molting hormone agonists, molting hormone analogs, molting inhibitors or other growth inhibitors that act by other mechanisms. In some embodiments the IGR includes Cyromazine.

According to various exemplary embodiments of the invention the granulated carrier includes silica and/or microcrystalline cellulose and/or sugar and/or starch and/or calcium salts and/or other inert material. For purposes of this specification and the accompanying claims, the term "inert material" means any carrier that the IGR is adsorbed onto and does not have specific chemical interaction between the IGR and the carrier. According to various exemplary embodiments of the invention inert materials serve as a physical carrier to hold the IGR.

Alternatively or additionally, in some embodiments the water barrier coating includes ethyl cellulose and/or cellulose acetate and/or ethyl acrylate and/or methyl methacrylate.

Alternatively or additionally, in some embodiments the in-feed IGR includes an enteric coating. According to various exemplary embodiments of the invention the enteric coting is either on the water barrier coating or under the water barrier coating. According to various exemplary embodiments of the invention the enteric coating includes hydroxypropyl methylcellulose phthalate (HP-55) and/or Zein and/or cellulose acetate phthalate and/or cellulose acetate succinate and/or methacrylic polymer and/or shellac.

Alternatively or additionally, in some embodiments the preparation includes a coating containing a hard oil and/or a fat and/or a wax. For purposes of this specification and the accompanying claims, the term "hard oil" indicates a melting point of at least 50° C., at least 60° C., at least 70° C., at least 80° C., at least 90° C., at least 100° or intermediate or higher melting points. By way of example, in various embodiments of the invention the hard oil includes palm oil and/or palm kernel oil and/or coconut oil and/or rape seed oil and/or sunflower oil and/or corn oil and/or castor oil and/or cocoa butter and/or shea butter and/or butter and/or animal fat and/or any other hydrogenated vegetable oil. According to various exemplary embodiments of the invention the wax includes carnauba wax and/or candelilla wax.

Alternatively or additionally, in some embodiments the feed additive includes an additional coating containing ethyl cellulose and/or cellulose acetate and/or ethyl acrylate and/or methyl methacrylate.

Additional embodiments of the invention relate to animal feed containing an in-feed IGR as described above and having a Cyromazine concentration of 0.5 PPM, 1 PPM, 1.5 PPM, 2 PPM, 2.5 PPM, 3 PPM, 3.5 PPM, 4 PPM, 4.5 PPM, 5 PPM, 10 PPM or intermediate or greater concentrations.

Exemplary Manufacturing Method

FIG. 1 is a simplified flow diagram of a manufacturing method, indicated generally as 100, according to some exemplary embodiments of the invention.

Depicted exemplary method 100 includes dissolving 110 an IGR and adsorbing 120 the IGR on granules of inert material to produce a core and coating 130 the core with a water barrier coating. According to various exemplary embodiments of the invention the IGR includes triazine compounds and/or chitin synthesis inhibitors and/or juvenile hormone mimic and/or juvenile hormone analogs and/or molting hormone agonists and/or molting hormone analogs and/or molting inhibitors and/or other growth inhibitors with other growth inhibition mechanisms. In some embodiments the IGR includes Cyromazine. According to some exemplary embodiments of the invention the granules of inert material include silica and/or microcrystalline cellulose and/or sugar and/or starch and/or calcium salts and/or other inert minerals.

Alternatively or additionally, in some embodiments the water barrier coating includes ethyl cellulose and/or cellulose acetate and/or ethyl acrylate and/or methyl methacrylate.

Depicted exemplary method 100 also includes applying 140 an enteric coating to the water barrier coating and/or applying 142 an enteric coating to the core prior to coating 130 the core with the water barrier coating. In some embodiments the enteric coating includes hydroxypropyl methylcellulose phthalate (HP-55) and/or Zein and/or cellulose acetate phthalate and/or cellulose acetate succinate and/or methacrylic polymer and/or shellac.

In the depicted embodiment, method 100 includes applying 150 a lipid coating. According to various exemplary embodiments of the invention the lipid includes oils and/or fats and/or waxes as detailed hereinabove.

In the depicted embodiment, method 100 includes applying 160 an additional coating including ethyl cellulose and/or ethyl acrylate and/or methyl methacrylate.

In some embodiments coating 120 and/or 130 and/or applying 140 and/or 142 and/or 150 and/or 160 employ fluid bed encapsulation.

Exemplary Insect Control Method

Figure 2:
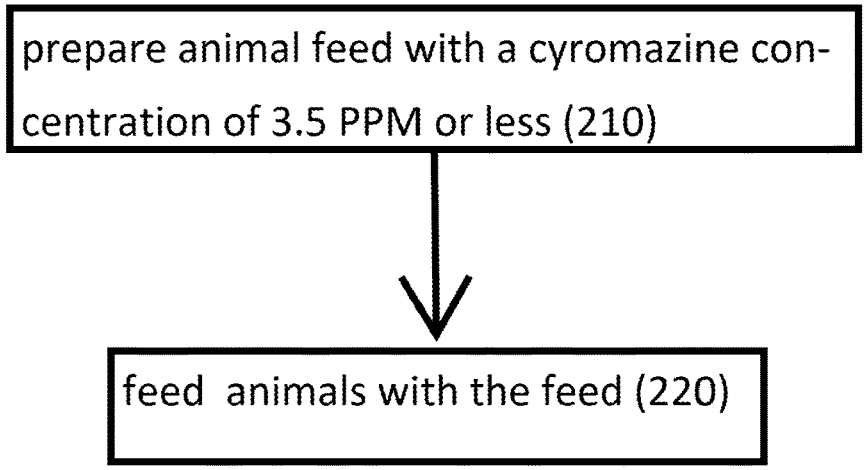

FIG. 2 is a simplified flow diagram of an insect control method, indicated generally as 200, according to additional exemplary embodiments of the invention.

Depicted exemplary method 200 includes preparing 210 animal feed with a Cyromazine concentration of 3.5 PPM, 3.0 PPM, 2.5 PPM, 2.0 PPM, 1.5 PPM, 1.2 PPM, 1.0 PPM, or lesser or intermediate concentrations and feeding 220 animals with the feed. As demonstrated in experimental examples hereinbelow, the unusually low concentration of Cyromazine in the feed retains insecticidal activity in manure if the Cyromazine is formulated as set forth hereinabove and hereinbelow.

Exemplary Methods to Reduce Cyromazine in Eggs

Figure 3A:
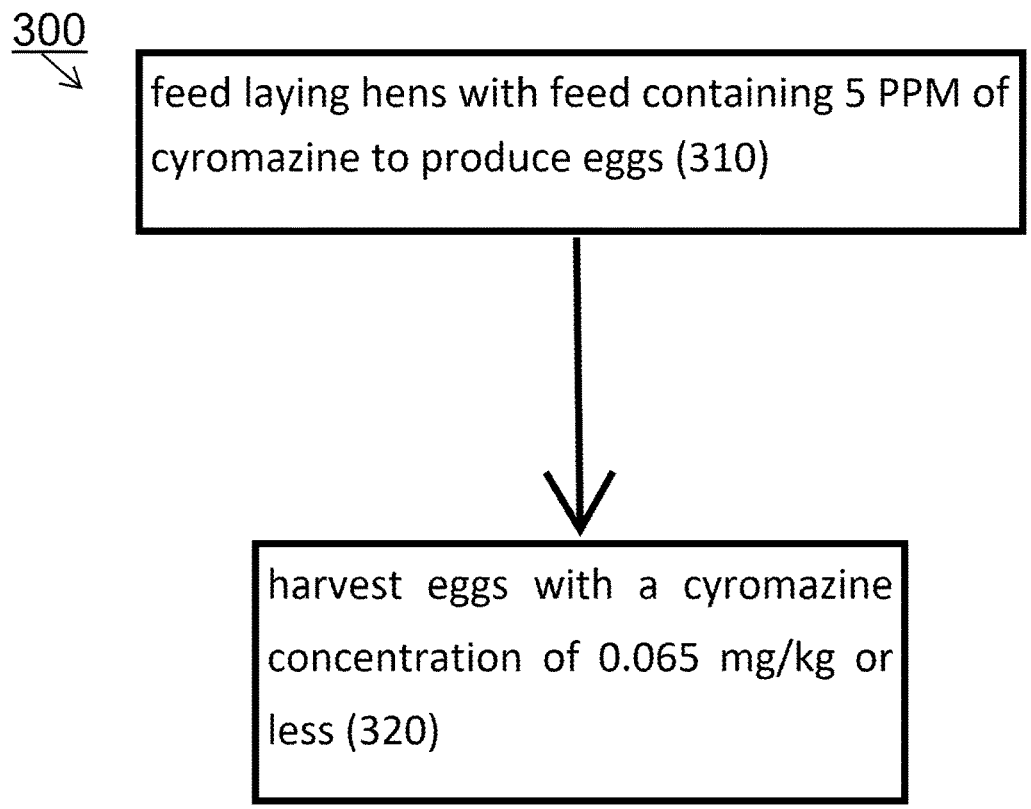

FIG. 3A is a simplified flow diagram of a method to reduce Cyromazine concentration in eggs, indicated generally as 300, according to further additional exemplary embodiments of the invention.

Depicted exemplary method 300 includes feeding 310 laying hens with feed containing 5 PPM of Cyromazine to produce eggs and harvesting 320 the eggs with a Cyromazine concentration of 0.065 mg/kg or less.

Figure 3B:
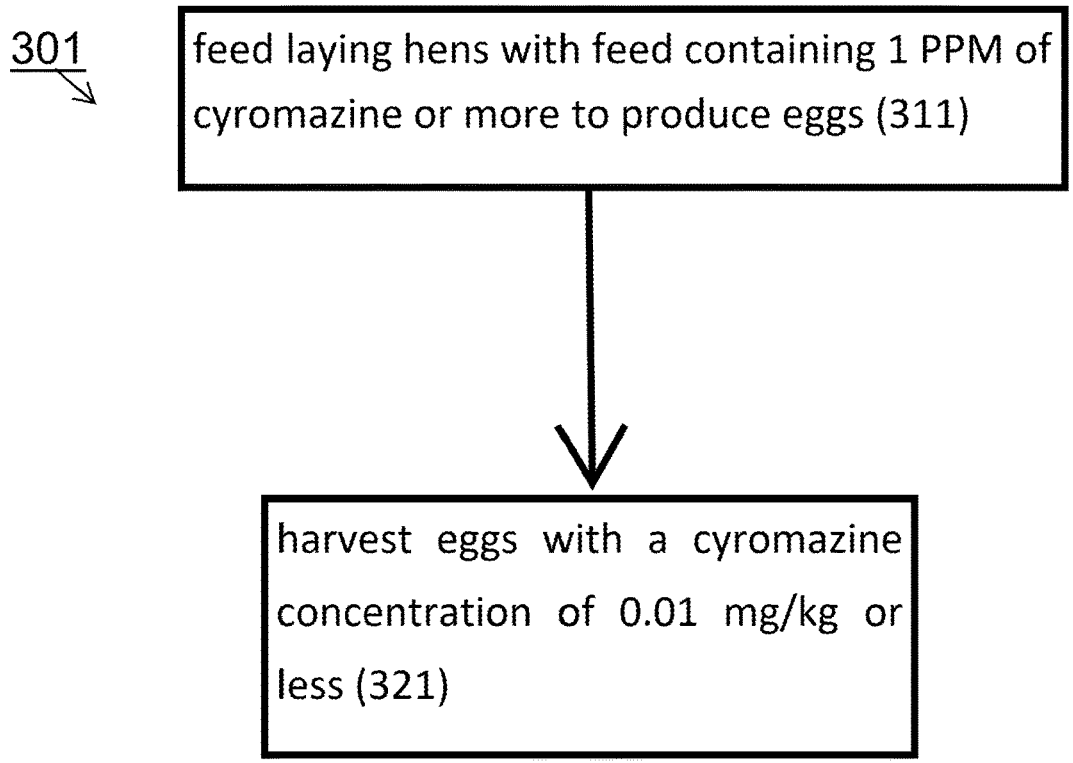

FIG. 3B is a simplified flow diagram of a method to reduce Cyromazine concentration in eggs, indicated generally as 301, according to further additional exemplary embodiments of the invention.

Depicted exemplary method 301 includes feeding 311 laying hens with feed containing 1 PPM of Cyromazine or more to produce eggs and harvesting 321 the eggs with a Cyromazine concentration of 0.01 mg/kg or less.

Exemplary Use of Naturally Occurring Insecticidal Toxins (NOIT)

Naturally Occurring Insecticidal Toxins (NOIT) are widely described in the literature (see for example Opender Koul (2016) The Handbook of Naturally Occurring Insecticidal Toxins Insect Biopesticide Research Centre, Jalandhar, India; "Potentiality of plants as source of insecticide principles" Zoubiri and Baaliouamer (2014) Journal of Saudi Chemical Society 18: 925-938 and Opender Koul (2019) Insecticides of Natural Origin; each of which is fully incorporated herein by reference). Many NOIT are flavonoids, phenols or terpenes.

In the context of various exemplary embodiments of the invention, NOIT with demonstrable activity against flies are of the most interest. Saponin is one example of an NOIT with demonstrable activity against flies. Other Examples of NOIT with demonstrable activity against flies include, but are not limited to Steroidal aglycone, Steroidal glycosides, Bidentatoside, Gamboukokoensides A and B, Ginsenosides, glycosides of triterpenoid aglycones, hederageneincellobioside, oleanolic acid cellobioside, epihederageneincellobioside, gypsogeneincellobioside, Triterpenoids, Cytotoxic pentacyclic triterpenes, Triterpene glycoside, Astersedifolioside A, B and C, Gypenosides, Sapogenol A and B, Polyhydroxyoleanene, Aesculiosides, Barringtosides A, B and C, ceposide A, ceposide B, and ceposide C, Furostanol glycosides, steroids of spirostan and furostan series, Seco-glycopyranosyl moiety, Triterpenicaglycone, and Triterpene glucosides.

Although these materials have not yet been tested in vivo, as was done with Saponin, their insecticidal activity is known and is independent of the properties of the various coating materials and coating methodologies described above.

Experimental examples provided hereinbelow offer guidance for implementation of additional exemplary embodiments of the invention by a skilled practitioner using other NOITs.

Exemplary Advantages

The application describes use of coating materials that are known in the pharmaceutical industry. However, the way in which they are employed differs from common pharmaceutical practice. The pharmaceutical industry is typically attempting to achieve a delayed release or sustained release profile of the active pharmaceutical ingredient (API). However, the pharmaceutical industry is typically interested in high levels of absorption of the API into the body.

In sharp contrast, the described embodiments of the invention use the known coating materials to ensure that the API (an in-feed life cycle interruption agent (LCIA)) passes through the animal with little or no digestion and/or absorption. In this way, activity of the LCIA is preserved/moreover, the coating not only protect the LCIA from released in the body but allow it to be released in the waste of the animal that consumed the food containing it.

This approach to coating represents a significant departure from known practice and provides a new category of agricultural products.

It is expected that during the life of this patent many additional coating materials and/or LCIA and/or IGRs and/or NOIT will be developed and the scope of the invention is intended to include all such new technologies a priori.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and do not limit the scope of the invention which is defined solely by the following claims.

Each recitation of an embodiment of the invention that includes a specific feature, part, component, ingredient module or process is an explicit statement that additional embodiments of the invention not including the recited feature, part, component, module, ingredient or process exist.

Alternatively or additionally, various exemplary embodiments of the invention exclude any specific feature, part, component, module, ingredient, process or element which is not specifically disclosed herein.

Specifically, the invention has been described in the context of poultry (such as layer hens) but might also be used in the context of other monogastric animals such as swine, rabbits, dogs and horses. Alternatively or additionally, by adding an additional coating that protects the LCIA (e.g saponin and/or an IGR such as Cyromazine) from inactivation in a rumen, it is believed the invention can be implemented in ruminants such as cattle, sheep and goats.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

Additional objects, advantages, and novel features of various embodiments of the invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above description, illustrates the invention in a non-limiting fashion.

Example 1

First Wet Granulation Process

In order to produce granules for use as a feed additive, Yucca powder (*Yucca schidigera*) dry plant powder containing ≥10% saponins (Agroin, Mexico) was mixed with adhesives materials as in table 1.

TABLE 1 first wet granulation formulation

| Ingredient | % (W/W) |
| --- | --- |
| Yucca powder >10% saponin | 50 |
| Corn starch | 25 |
| Maltodextrin | 25 |
| CMC carboxymethyl cellulose | 0.0033 |

Boiling water was added at 25% of total weight while mixing. The semi dry material was passed through a screen to receive particles of 500-1400 microns in size. After drying to 10% LOD the particles were ready for coating at this stage.

Example 2

Alginate Wet Granulation Process

In order to produce granules for use as a feed additive Yucca powder (as in Example 1) was mixed with adhesives materials as in table 2.

TABLE 2

Alginate wet granulation formulation

| Ingredient | % (W/W) |
| --- | --- |
| Yucca powder >10% saponin | 50-75 |
| Sodium alginate (Algaia, France) | 50-25 |

Tap water at room temperature was added at 25% of total weight while mixing. The semi dry material was passed through a screen to receive particles of 500-1400 microns in size. After drying to 10% LOD the particles are ready for use.

Example 3

Dry Granulation Process

In order to produce granules for use as a feed additive Yucca powder (as in previous examples) was mixed with adhesives materials as in table 3.

TABLE 3 dry granulation formulation

| Ingredient | % (W/W) |
| --- | --- |
| Yucca powder >10% saponin | 60 |
| Microcrystalline cellulose (MCC) | 40 |

A Roller Compactor was used to compact the mix of Yucca powder and MCC. The compacted material was ground thru a screen of 1500 microns to get particles of 500-1400 microns. The particles are ready for coating at this stage.

Example 4

HP Enteric Coating

A fluid bed coater (FLP-3 coater, Changzhou Jiafa, China) with a Wurster insert was used to coat the granules prepared according to any of Examples 1 or 3. One to two kg of the granules were fluidized in the fluid bed coater at the bottom sprayed configuration with an organic (acetone-methanol, 1:1) solution of 9.1% hydroxypropyl methylcellulose phthalate (HP-55) (Lotte fine chemical, South Korea) to achieve a 25% coating (w/w). The fluidizing air was heated to 70° C. in order to evaporate the organic solvents.

Example 5

Stearic Acid Enteric Coating

Alternatively, coating of the granules prepared according to any of Examples 1 or 3 was accomplished by spraying a melted stearic acid on the granules in quantity of 50% of total weight. A fluid bed coater (FLP-3 coater, Changzhou Jiafa, China) with a Wurster insert was used to coat the granules prepared according to any of Examples 1 or 3. One to two kg of the granules were fluidized in the fluid bed coater at the bottom sprayed configuration. The inlet temperature of the fluidizing air was 25° C. and the stearic acid was melted at 100° C.

Example 6

Effect of Saponin Added Directly to Poultry Waste on Eggs and Larvae of House Flies In order to evaluate the activity and influence of saponin extract from *Yucca* plant (*Yucca schidigera*) on the vitality and survival of house flies' eggs and larvae the activity of different *yucca*'s saponin extracts was compared.

The tested extracts were:
Butanol extract of Saponin from *yucca* plant powder (Biopowder *yucca* 10% saponins).
Water extract of Saponin from *yucca* plant powder (Biopowder *yucca* 10% saponins).
The temperature of the water was 40° and the solution stayed in stirrer for 48 hours.
Commercial *Yucca*'s Saponin extract powder—Sarasaponin (30% saponins)

Commercial laying hen excrement was collected, frozen, dried and ground in order to eliminate any eggs/larvae/pupae of flies/other insects originating from the farm.

The ground excrement was spread in 82 disposable cups, 10 cups replicate for A-G group and 6 cup replicates for treatments H-I.

The cups were filled with 30 grams of waste that was mixed with 70 ml of water/extract solution (according to the treatment groups below), so the humidity of the waste will be 70% as in a typical commercial poultry farm. The cups were marked with the group letters and repeat number.
Treatment Groups:
- (A) Negative control (ground excrement without any saponin supplement)
- (B) *Yucca* powder, saponin dose of 500 ppm (0.05%) in feed: 0.5 gr *yucca* powder (Biopowder *yucca* 10% saponins) in 100 gr wet waste
- (C) Water Saponin extraction of *yucca* plant powder (Biopowder *yucca* 10% saponins). Saponin dose of 500 ppm: 7.142 gr *yucca* powder in 1000 ml solution
- (D) Water Saponin extraction of *yucca* plant powder (Biopowder *yucca* 10% saponins). Saponin dose of 350 ppm: 5 gr *yucca* powder in 1000 ml solution.
- (E) Butanol Saponin extraction of *yucca* plant powder (Biopowder *yucca* 10% saponins). Saponin dose of 500 ppm: 7.142 gr *yucca* powder in 1000 ml solution.
- (F) Butanol Saponin extraction of *yucca* plant powder (Biopowder *yucca* 10% saponins). Saponin dose of 350 ppm: 5 gr *yucca* powder in 1000 ml solution.
- (G) Sarsaponin (30% saponins)-commercial *Yucca*'s Saponin extract powder. Saponin dose of 500 ppm: 2.38 gr in 1000 ml water.
- (H) Positive control-LARVADEX (0.5% Cyromazine)-dose equivalent to 1000 gr/ton feed: 540 mg in 1000 ml water.
- (I) Biology activity negative control—waste without any larvicide supplement. No fly eggs/larvae seeded in the waste.

*Yucca* powder is insoluble in water, therefore the *yucca* powder of group B mixed with the dried waste and not as a solution. For homogeneity, the mixing made with mechanical mixer for 5 minutes.

In order to evaluate the pesticide effect on larva and eggs, each group had two tests:
1. Five cups (repeats number 1-5) of each group were seeded with 50 eggs of house fly
2. Five cups (repeats number 6-10) of each group were seeded 24 hours later with 50 house fly's 1St stage larvae.

After a week the excrement was washed and filtered through a sieve. The larvae and pupae were collected from the sieve and counted.

Statistical evaluation was done with Jump 07 software. Analysis of variance done using Anova test and the comparison of means done with Tukey-Kramer test, significance level-$\alpha = 0.05$.

Results:

TABLE 4

The number of vital larvae and pupae (the larvae that counted all looked vital and in a suitable size for their age) in each cup- group replicate

| | eggs seeded cups | | | larvae seeded cup | | |
|---|---|---|---|---|---|---|
| | Average vital | % survival | | Average vital | % survival | |
| Treatment | larvae | Average | SD | larvae | Average | SD |
| A | $26^a$ | $52^a$ | 6.3 | $48^a$ | $95^a$ | 1.67 |
| B | $1^b$ | $2^b$ | 1.73 | $3^b$ | $7^b$ | 4.56 |
| C | $36^a$ | $68^a$ | 14.86 | $46^a$ | $92^a$ | 4.98 |
| D | $28^a$ | $60^a$ | 11.93 | $48^a$ | $96^a$ | 1.41 |
| E | $28^a$ | $56^a$ | 11.97 | $49^a$ | $97^a$ | 3.74 |
| F | $22^a$ | $45^a$ | 7.93 | $47^a$ | $94^a$ | 1.41 |
| G | $30^a$ | $60^a$ | 6.65 | $45^a$ | $91^a$ | 4.38 |
| H | 0 | 0 | 0 | 0 | 0 | 0 |
| I | 0 | 0 | 0 | 0 | 0 | 0 |
| Pval | 0.0002 | <0.0001 | | <0.0001 | <0.0001 | |

Results Summarized in Table 4 Indicate:
- in the larvae seeds cups, there was almost no larvacidal effect to the treatments, beside treatment B;
- as expected, no live larvae/pupa were seen in the cups of group H and I in the eggs seeds cups and in the larvae seeds cups; and in the cups of group B, the *Yucca* powder treatment, there were lots of dead larvae (in different stages) in the larvae and eggs seeded cups.

TABLE 5

Pupa and larvae (vital, undeveloped, dead) in eggs seeded cups

| | Vital | Undeveloped | Dead larvae | Vital | % Survival | |
|---|---|---|---|---|---|---|
| Treatment | larvae | larvae | &pupae | pupae | Average | SD |
| A | $18.6^{ab}$ | 2 | $0^b$ | $7.2^{ab}$ | $51.6^a$ | 12.6 |
| B | $0.2^b$ | 9.2 | $5.8^a$ | $0.8^b$ | $2^b$ | 3.5 |
| C | $32^a$ | 0 | $0^b$ | $2.2^{ab}$ | $68.4^a$ | 25.5 |
| D | $26.2^a$ | 0.4 | $0.6^b$ | $2.2^{ab}$ | $59.6^a$ | 23.9 |
| E | $25.2^a$ | 1.2 | $0^b$ | $2.6^{ab}$ | $55.6^a$ | 23.9 |
| F | $13.2^{ab}$ | 0.4 | $0^b$ | $9.2^a$ | $44.8^a$ | 15.8 |

TABLE 5-continued

| | Pupa and larvae (vital, undeveloped, dead) in eggs seeded cups | | | | | |
|---|---|---|---|---|---|---|
| | Vital | Undeveloped | Dead larvae | Vital | % Survival | |
| Treatment | larvae | larvae | &pupae | pupae | Average | SD |
| G | 29$^a$ | 0 | 0$^b$ | 0.8$^b$ | 59.6$^a$ | 13.3 |
| H | 0 | 0 | 0 | 0 | 0 | 0.0 |
| I | 0$^b$ | 0 | 0 | 0$^b$ | 0 | 0.0 |
| Pval | 0.0015 | 0.2332 | 0.001 | 0.0057 | <0.001 | |

Results summarized in table 5 indicate treatment group B, yucca powder with 500 ppm saponin dose had almost no living larvae and pupae and was the group with highest number of dead larvae and pupae. This was statistically significant from the rest of the treatment group but not from the positive control with LARVADEX.

It is not clear why in the larvae seeds cups the survival rate was higher than that of the eggs seeds cup. It is possible that the difference is due to maybe due to a naturally low hatching rate.

These results indicate that the average larvae survival rate was 95% at the negative control larvae seeded cups, while in the seeded eggs cups, at that group, the survival rate was only 52%.

Out of all the examined groups, group B, the Yucca powder with a 500-ppm dose, had the best pesticide effect with survival rate of 2%-7% meaning 93-98% mortality. This result was statistically significant.

The Butanol extract and water extract prepared from biopowder had no significant larvicide effect. Among the extracts treatment, treatment F-Butanol Saponin extraction of yucca plant powder at a Saponin dose of 350 ppm, showed the most larvicide effect with a mortality rate of 55%.

Results of this example demonstrate that Yucca extracts were not effective in killing larvae.

In sharp contrast, Yucca plant powder with a nominal concentration in manure of 500 ppm saponin has significant larvicidal activity in the manure. The actual concentration in manure is presumed to be lower than this. This suggests that if Saponin could be incorporated into feed in way that allows it to pass though the digestive tract without inactivation, it could function as a larvacide in manure.

Example 7

Additional Experiment

Effect of Saponin Added Directly to Poultry Waste on Eggs and Larvae of House Flies Example 6 demonstrated that 500 ppm of Saponin from Yucca plant powder (Yucca Schidigera), showed a larvacidal activity of almost 100% on larvae (survival rate was 2%-7%).

An additional study was conducted to determine the Minimal Inhibitory Concentration (MIC) of Saponin from Yucca plant powder for larvae. In addition, yucca saponin extract was tested again.
Experiment Design:
Excrement from commercial laying hens was collected and frozen, dried and ground as in the previous example.

The dried ground excrement was spread in 60 disposable cups, 6 cups replicate for A-I group treatments and 3 cup replicates for treatments J-K.

The cups were filled with 30 grams of excrement that was mixed with 70 ml of water/extract solution (according to the treatment groups below), so the humidity of the excrement will be 70% as in a typical laying house. The cups were marked with the group letters and replicate number.

Statistical evaluation was done with Jump 07 software. Analysis of variance done with Anova test and the comparison of means done with Tukey-Kramer test, significance level-$\alpha$=0.05.
Treatment Groups:
  (A) Negative control (waste without any larvacid supplement)
  (B) Yucca powder, saponin dose of 500 ppm (0.05%) in feed: 0.5 gr yucca powder (Biopowder yucca 10% saponins) in 100 gr wet waste
  (C) Yucca powder, saponin dose of 350 ppm (0.035%) in feed: 0.35 gr yucca powder (Biopowder yucca 10% saponins) in 100 gr wet waste
  (D) Yucca powder, saponin dose of 200 ppm (0.02%) in feed: 0.2 gr yucca powder (Biopowder yucca 10% saponins) in 100 gr wet waste
  (E) Yucca powder, saponin dose of 150 ppm (0.015%) in fed: 0.15 gr yucca powder (Biopowder yucca 10% saponins) in 100 gr wet waste
  (F) Commercial extraction of yucca plant (*8-12% saponin complex, BAJA YUCCA COMPANY). Saponin dose of 500 ppm: 7.142 gr yucca powder in 1000 ml solution
  (G) Butanol Saponin extraction of yucca plant powder (Biopowder yucca 10% saponins). Saponin dose of 500 ppm: 7.142 gr yucca powder in 1000 ml solution.
  (H) Water+Ethanol Saponin extraction of yucca plant powder (Biopowder yucca 10% saponins). Saponin dose of 500 ppm: 7.142 gr yucca powder in 1000 ml solution.
  (I) Water Saponin extraction of yucca plant powder (Biopowder yucca 10% saponins). Saponin dose of 500 ppm: 7.142 gr yucca powder in 1000 ml solution.
  (J) Positive control-Larvadex (0.5% Cyromazine)-dose equivalent to 1000 gr/ton of feed: 540 mg in 1000 ml water.
  (k) Biology activity negative control—waste without any larvicide supplement. No fly eggs/larvae seeded in the waste.

Yucca powder is insoluble in water; therefore, the yucca powder of groups B-E was mixed with the dried waste. For homogeneity, the mixing made with mechanic mixer for 5 minutes.

All disposable cups were seeded with 30 house fly's 1St stage larvae.

After a week the waste was washed and filtered through a sieve. The larvae and pupae were collected from the sieve and counted.

Results are summarized in Table 6.

As shown in Table 6, the *yucca* powder was effective in all tested doses (150 ppm-500 ppm saponin), with 0%-4.8% survival rate. These results are significantly different from the negative control group, commercial extract group and the Butanol extract group.

Table 6 also shows that the commercial extract was ineffective with an average survival rate of 88%, not significantly different from the negative control and the Butanol extract.

Table 6 also shows that Butanol extract was ineffective with, a survival rate of 78.3%, not significantly different from the negative control and the commercial extract.

TABLE 6

Larvae, pupae and survival percentage by treatment group

| Treatment | Vital larvae | Undeveloped larvae | Dead larvae &pupae | Vital pupae | % Survival Average | SD |
|---|---|---|---|---|---|---|
| A | $10.2^{ab}$ | 2 | $0^b$ | 10.2 | $89.2^a$ | 37.9 |
| B | $0^c$ | 0.4 | $0^b$ | 0 | $0^b$ | 0.0 |
| C | $0^c$ | 0.5 | $6.2^{ab}$ | 0.5 | $1.7^b$ | 2.9 |
| D | $0.2^c$ | 0.5 | $0.5^b$ | 0.2 | $1.2^b$ | 2.9 |
| E | $1.2^{bc}$ | 0.3 | $9^{ab}$ | 0.3 | $4.8^b$ | 9.0 |
| F | $21.4^a$ | 0 | $1.6^b$ | 5 | $88^a$ | 11.4 |
| G | $20.2^a$ | 0 | $3^b$ | 3.3 | $78.3^a$ | 21.9 |
| H | $0^c$ | 5 | $12.2^a$ | 2.5 | $8.3^b$ | 8.2 |
| I | $0^c$ | 5.3 | $12.2^a$ | 0.7 | $2.2^{'b}$ | 4.0 |
| J | $0^c$ | 0 | $0^b$ | 0 | 0 | 0 |
| K | $0^c$ | 0 | $0^b$ | 0 | $0^b$ | 0 |
| Pval | <0.001 | 0.0098 | <0.001 | 0.0785 | <0.001 | |

Table 6 also shows that the extract with water and the extract with water+ethanol (each 500 PPM saponin) were both effective with a survival rate of 2.2% and 8.3% respectively, significantly different from the negative control, commercial extract group and the Butanol extract group.

This dose dependence study shows that saponin from *Yucca* plant powder had a distinct larvicidal activity even at the lowest dose of 150 ppm saponin in manure.

This trial, like Example 6, showed that *Yucca* extract, whether a commercial one or made by the investigator's had no larvicidal effect except for the water Saponin extractions of *yucca* plant powder at a dose of 500 ppm.

Results of Examples 6 and 7 suggest that if the formulations of examples 1 to 6 can deliver ≥150 ppm of Saponin in manure when fed to birds, there will be a larvicidal effect.

Example 8

Effect of Protected Saponin in Feed on Eggs and Larvae of House Flies in Resultant Waste In order to protect the saponin molecules and keep its activity throughout the digestive system of the laying hens it needs to be granulated and encapsulated. Moreover, the saponin need to stay stable in the digestive tract and to be released and act in the manure of the birds, where flies lay their eggs.

For this reason a granulated and encapsulated *Yucca* powder product, preparation *Yucca* 134 (prepared as in Example 4 above) was evaluated to determine its biological efficacy in a relevant agricultural context. *Yucca* 134 is a granulated and encapsulated *Yucca* powder, particle size 500-1400 micron containing 3.6% Saponin.

For this experiment 12 Lohman laying hens, housed in conventional cages, were divided into 3 groups, four layer per group 2 hens in a cage.

The feed was based on crushed pelleted layers feed (17.5% protein), with no antibiotic growth promotor, mixed with the tested material, by the groups described below.

The laying hens were fed for two weeks with feeds by the treatments described below and 500 grams of excrement was collected from each treatment group. The collected excrement was frozen for 72 hours in order to eliminate any larvae/eggs that originated from the farm.

Some waste from group C was not frozen, to control for the possibility that freezing the *Yucca* will affect its potency.

Treatment Groups:

A. Negative control (feed without any Larvacidal supplement)
B. Positive control-feed containing Larvadex (0.5% Cyromazine)-1 kg/ton
C. *Yucca* 134 feed containing 5.6 kg/ton *Yucca* 134 (Saponin dose-200 ppm).

Each group had 5 replicates: 5 disposable cups were filled with 80 grams of excrement. The cups were marked with the group letters and replicate number. All cups were seeded with 30 1St stage larvae of house fly (*Musca Domestica*) which is the common fly at layer houses.

After a week the excrement was filtered through a sieve and the larvae and pupae were counted for survival calculation.

TABLE 7

Larvae and Pupae survival rate by treatment group

| Treatment group | No of live larvae | No of live pupae | No of dead larvae/pupae | % survival Average | SD |
|---|---|---|---|---|---|
| A | $4^a$ | $26.8^a$ | $0^b$ | $97.3^a$ | 7.9 |
| B | $0^b$ | $0^b$ | $0^b$ | $0^b$ | 0.0 |
| C | $0.2^{ab}$ | $1.2^b$ | $11.8^a$ | $4.7^b$ | 7.5 |
| C fresh waste | $0^b$ | $0.8^b$ | $2.4^b$ | $2.7^b$ | 4.3 |
| P val | 0.0224 | <0.001 | <0.001 | <0.001 | |

Statistical evaluation was done with Jump 07 software. Analysis of variance done with Anova test and the comparison of means done with Tukey-Kramer test, significance level-α=0.05.

Results summarized in Table 7 indicate that *Yucca* 134 preparation (200 PPM protected saponin/Kg of feed) fed to laying hens has a lethal effect for larvae and pupa either in the frozen waste or in the fresh waste, with survival rate of 4.7% and 2.7% respectively. The results are statistically significant from the negative control.

These results indicate that granulation and encapsulation of *Yucca* powder, in *Yucca* 134 preparation, protected the *Yucca* saponin from inactivation in the digestive system of the birds. The saponin appear to have been gradually released in the manure.

The *Yucca* 134 preparation appears effective as a fly larvacidal feed additive for laying hens at 200 ppm saponin in the feed.

The freezing of the excrement did not decrease the saponin potency of *Yucca* 134.

Example 9

Minimal Inhibitory Concentration (MIC) for Fly Larvae In Vivo of Granulated and Encapsulated Saponin Source In order to determine a minimum inhibitory concentration for granulated and encapsulated saponin (*Yucca* 134) in feed an experiment was conducted. In addition, the effect of fresh excrement as opposed to frozen excrement was examined.

*Yucca* 134 (as described in Example 8), was used as a Saponin source. 32 Lohman laying hens were divided into 8 treatment groups, 4 layer per group.

The test material was mixed in a crushed pelleted layer feed (17.5% protein), with no antibiotic growth promotor.

Treatment groups are listed in Table 8.

For one week before starting the trial and while feeding the hens with the trial feeds (A) through (I) as listed in table 5, laying percent and the size of the eggs (gr) was monitored to ensure that the preparation is not causing any damage. Hens were 79 weeks old at the beginning of the trial the average eggs size was 69 gr and the average laying percent was 90.8%.

After two weeks of feeding the hens trial feeds (A) through (I) as listed in table 5, excrement was collected—800 grams for each group. 400 grams of excrement was frozen for 72 hours in order to eliminate any contained larvae/eggs.

For each group 4 disposable cups were filled with 80 grams of waste+20 ml of water in order to get the larvae growing substrate to a 60-70% moisture. The cups were marked with the group letters and replicate number.

TABLE 8 treatment groups

| Treatment group | Saponin in feed (PPM) | Yucca 134 in feed (gr/ ton) |
|---|---|---|
| (A) Negative control | N/A | N/A |
| (B) Positive control - feed containing Larvadex (0.5% Cyromazine) –1 kg/ton | N/A | N/A |
| (C) | 300 | 8330 |
| (D) | 200 | 5600 |
| (E) | 150 | 4200 |
| (F) | 100 | 2800 |
| (G) | 50 | 1400 |
| (H) Yucca 233-2-20 granulated Yucca powder | 200 Not encapsulated | NA |
| (I) Biology activity negative control No fly larvae seeded in the feces. | 000 | NA |

For the *Yucca* treatments C, D, E F and G, four additional cups were made for each group containing fresh excrement that has not been frozen—in order to test the effectiveness of the preparation in a natural, unsterile growth substrate. All cups were seeded with 30 1St stage larvae of house fly (*Musca Domestica*).

After 10 days of incubation, the waste was filtered through a sieve and the larvae and pupae were counted for survival calculation.

Statistical evaluation was done with Jump 07 software. Analysis of variance done using Anova test and the comparison of means done with Tukey-Kramer test, significance level-$\alpha$=0.05. Results are summarized in Table 9.

Results presented in Table 9 indicate that granulated and encapsulated *Yucca* powder (*Yucca* 134) is larvicidal at 150 ppm dose or higher (Groups E, D and C). Results for these groups are significantly different from the negative control group, the 50 ppm dose group (G) and the granulated with no encapsulation group. This is true in both frozen and fresh excrement.

The 100 ppm group (F) also had a larvacidal effect with survival rate of 20.8% and 10.3% respectively. This result is statistically different from the negative control group, but not from the 50 ppm dose group and the granulated with no encapsulation group. Again, results were similar for frozen and fresh excrement.

TABLE 9 effect of saponin in fresh and frozen excrement on fly survival

| | Fresh waste | | | | | Frozen waste | | | | |
|---|---|---|---|---|---|---|---|---|---|---|
| | Live | Dead larvae | Live | Survival rate | | Live | Dead larvae | Live | Survival rat | |
| Group | larvae | & pupae | pupae | $\bar{x}$ | SD | larvae | & pupae | pupae | $\bar{x}$ | SD |
| A | $2^b$ | $0^c$ | $17.3^a$ | $67.5^b$ | 9.4 | $0^b$ | $0^b$ | $27.7^a$ | $92.2^a$ | 8.4 |
| B | $0^b$ | $0^c$ | $0^c$ | $0^d$ | 0.0 | 0 | $0^b$ | $0^d$ | $0^c$ | 0.0 |
| C | $0^b$ | $0.5^c$ | $1^c$ | $0.3^d$ | 1.7 | $0^b$ | $0.8^b$ | $0^d$ | $0^c$ | 0.0 |
| D | $0^b$ | $0.5^c$ | $0^c$ | $0^d$ | 0.0 | $0^b$ | $3^b$ | $0^d$ | $0^c$ | 0.0 |
| E | $0^b$ | $1^{bc}$ | $0^c$ | $0^d$ | 0.0 | $0.8^b$ | $10.5^{ab}$ | $1^{cd}$ | $5.8^c$ | 9.6 |
| F | $1^b$ | $12.8^a$ | $2^c$ | $10^{cd}$ | 11.2 | $0.8^b$ | $17.3^a$ | $5.5^{cd}$ | $20.8^{bc}$ | 25.2 |
| G | $5.8^b$ | $5.8^b$ | $10.3^b$ | $53.3^{bc}$ | 23.9 | $7.75^a$ | $8.8^{ab}$ | $11.8^{bc}$ | $65^{ab}$ | 33.8 |
| H | $43.8^a$ | $0^c$ | $0^c$ | $145.8^a$ | 83.9 | $0.3^b$ | $7^{ab}$ | $16.8^{ab}$ | $56.7^{ab}$ | 30.2 |

TABLE 9-continued effect of saponin in fresh and frozen excrement on fly survival

| | Fresh waste | | | | | Frozen waste | | | | |
|---|---|---|---|---|---|---|---|---|---|---|
| | Live | Dead larvae | Live | Survival rate | | Live | Dead larvae | Live | Survival rat | |
| Group | larvae | & pupae | pupae | $\bar{\bar{x}}$ | SD | larvae | & pupae | pupae | $\bar{\bar{x}}$ | SD |
| I | $0^b$ | $0^c$ | $0^c$ | $0^d$ | 0.0 | $0^b$ | $0^b$ | $0^d$ | $0^c$ | 0.0 |
| Pval | 0.004 | <0.001 | <0.001 | <0.001 | | 0.011 | 0.002 | <0.001 | <0.001 | |

At 50 ppm (group G) larvicidal effectiveness was decreased and survival rate was 53%-65%.

The granulated, not encapsulated, *Yucca* powder showed 56% survival in the fresh waste. The survival rate in the frozen waste was higher than 100% which indicate a possible counting mistake when seeding the eggs. In this group there were no pupae.

Even at the highest tested saponin concentration (300 PPM, Group C) there was no negative effect on layer's performance (average egg size and laying percentage).

These results suggest that the lowest effective larvicidal dose of encapsulated Saponin is 100 PPM in feed which corresponds to 2.8 Kg. of *Yucca* 134 per ton of feed. This amount allowed only 15% of flies to survive and appears to be the MIC of protected saponin in feed These results are consistent with the results of example 8 which demonstrated the protective effect of 200 PPM of protected saponin in feed.

The effect of saponin on other insects, such as beetles was not assayed although they were observed in the excrement while preparing the cups.

Example 10

Additional Minimal Inhibitory Concentration (MIC) Study for Fly Larvae In Vivo

The purpose of this experiment was to evaluate the MIC for fly larvae of the granulated and encapsulated *Yucca* powder (preparation *Yucca* 134) after exposing the protected saponin to conditions that mimic the conditions of commercial feed processing.

36 Lohman laying hens were divided to 9 groups, four hens per group.

Crushed layers feed (17.5% protein) with no antibiotic growth promotor was mixed with the tested material. For each treatment group 18 kilograms of feed was mixed.

Treatment (I) purpose was to test the bioactivity of the preparation after exposing it to heat and moisture that are similar to the conditions of feed processing. In treatment I granulated and encapsulated *Yucca* powder (*Yucca* 134) was mixed with corn and was pelleted in high temperature (80°) with 12% moisture, crushed and mixed with the layers feed.

TABLE 10 treatment groups

| Treatment group | Saponin in feed (PPM) | Yucca 134 in feed (gr/ton) |
|---|---|---|
| (A) Negative control | N/A | N/A |
| (B) Positive control - feed containing Larvadex (0.5% Cyromazine) −1 kg/ton | N/A | N/A |
| (C) | 200 | 5600 |
| (D) | 100 | 2800 |
| (E) | 70 | 2000 |
| (F) | 50 | 1400 |
| (G) Yucca 132-6-19: granulated Yucca powder, , no encapsulation | 200 | N/A |
| (H) yucca powder (10% saponin) no encapsulation | 200 | N/A |
| (I) yucca powder granulated, encapsulated and pelleted (9% yucca encapsulated) | 100 | 3100 |
| (J) Biology activity negative control - feed without any larvacid supplement. No fly larvae seeded in the litter. | N/A | N/A |

*Yucca* 134 as described in previous examples served as a source of encapsulated saponin. Treatment groups are described in Table 10.

After two weeks of feeding the hens, 500 grams of waste was collected from each treatment group. The waste was frozen for 72 hours in order to eliminate any contained larvae/eggs from the farm.

For each group 5 disposable cups were filled with 60 grams of waste. Since the litter was very dry 40 ml water added to each cup, and after 4 days an additional 10 ml of water was added. The cups were marked with the group letters. All cups were seeded with 30 1St stage larvae of house fly (*Musca domestica*).

After a week the waste was filtered through a sieve and the larvae and pupae were counted for survival calculation.

Statistical evaluation was done with Jump 07 software. Analysis of variance done with Anova test and the comparison of means done with Tukey-Kramer test, significance level-α=0.05.

TABLE 11

Larval survival rate by treatment group

| Treatment group | Live larvae | Dead larvae | Live pupae | Dead pupae | % survival Average | SD |
|---|---|---|---|---|---|---|
| A | $25.6^a$ | $0^b$ | $3^{bc}$ | $0^b$ | $95.33^a$ | 9.3 |
| B | $0^c$ | $0^b$ | $0^c$ | $0^b$ | $0.00^b$ | 0.0 |
| C | $0.8^c$ | $3.4^a$ | $0.6^{bc}$ | $2.2^{ab}$ | $4.67^b$ | 5.6 |
| D | $22.8^{ab}$ | $0.2^b$ | $1^{bc}$ | $4.6^a$ | $79.33^a$ | 13.4 |
| E | $22.6^{ab}$ | $0.2^b$ | $1.8^{bc}$ | $3.8^{ab}$ | $81.33^a$ | 15.4 |
| F | $13.2^b$ | $0.2^b$ | $11.4^a$ | $2.6^{ab}$ | $82.00^a$ | 15.7 |
| G | $23.2^{ab}$ | $0^b$ | $4.8^{bc}$ | $0^b$ | $93.33^a$ | 7.1 |
| H | $23.4^{ab}$ | $0.6^b$ | $1.6^{bc}$ | $0^b$ | $83.33^a$ | 11.8 |
| I | $19.4^{ab}$ | $0.2^b$ | $6^{ab}$ | $1^{ab}$ | $84.67^a$ | 17.6 |

TABLE 11-continued

Larval survival rate by treatment group

| Treatment group | Live larvae | Dead larvae | Live pupae | Dead pupae | % survival Average | SD |
|---|---|---|---|---|---|---|
| J | 0 | 0 | 0 | 0 | 0 | 0.0 |
| Pval | <0.001 | 0.0029 | <0.001 | 0.0035 | <0.001 | |

Results summarized in Table 11 indicate that 100 ppm encapsulated saponin in feed and less were not larvacidic. Results from Groups D, E and F were not statistically different from the negative control group. Compare to results from Example 9 in which 150 PPM allowed only 6% of larva to survive.

Group C with 200 ppm encapsulated saponin was statistically different from the rest of the treatment groups with survival rate of only 5%. This result is not significantly different from the results obtained with 0.5% cyromazine in Group B.

The encapsulated pelleted *Yucca* powder of Group I (100 ppm saponins) also showed no larvicidal effect. As expected, the non-encapsulated preparations of groups G and H did not have a larvicidal effect despite a nominal saponin concentration in the feed of 200 PPM.

Results summarized in Table 11 confirm that 200 ppm encapsulated saponin is larvicidal for fly larvae. These results do not contradict the results of Example 9 which suggested that the MIC of encapsulated saponin is 100 PPM.

Results summarized in Table 11 confirm the importance of encapsulation in vivo. The un-encapsulated *yucca* preparations were ineffective, even at the same nominal saponin concentration.

The encapsulated pelleted *Yucca* powder of group (I) also showed no effect probably because the 100 ppm saponin concentration is below the MIC determined in this experiment.

Examples 8 through 10 demonstrate that amounts ≥100 PPM of protected Saponin in feed demonstrate a larvicidal effect in manure. Examples 6 and 7 demonstrate that the equivalent of ≥150 PPM as if in feed placed directly in manure produced a larvicidal effect (assuming 100% passes through the digestive tract). Examples 6 through 10 together suggest that incorporation of ≥100 PPM of protected Saponin in feed leads to appearance of larvicidal effect of ≥150 PPM (simulated in feed) of saponin in manure. There is no direct assay to establish that feed saponin that appears in the manure is still protected in the manure.

However, it can be assumed that the saponins in the manure are protected since there is a larvacidial effect (non encapsulated showed no effect at the same dose) and also because it has the same coating as of the Cyromazine product which is probably protected in the manure as the amount of Cyromazine in the eggs indicate that it is hardly absorbed.

Example 11

Preparation of CYR234 (1.1%-1.4% Cyromazine)

In order to prepare a Cyromazine preparation that could be incorporated in animal feed and pass through the digestive tract with a low rate of digestion and/or absorption the following protocol was followed:

Silica (Klinofeed) 1500 g were charged into a fluid bed coater and then sprayed with a solution made from 2000 g methanol, 70 g Cyromazine, 250 g acetone, 30 g isopropanol, 50 g ethylcellulose and 5 g canola oil. The resultant Cyromazine adsorbed on silica was referred to as CYR-153.

1400 g of CYR-153 were coated by bottom spraying in a fluid bed coater equipped with a Wurster cylinder with a solution containing 182 g ethylcellulose, 18 g canola oil, 1200 g acetone, 120 g isopropanol. The resultant product with a water barrier was called CYR-154.

1300 g of CYR-154 were coated in a fluid bed coater with a solution made from 1300 g of methanol, 1300 g acetone, 260 g hydroxypropyl methylcellulose phthalate (HP-55) and 26 g canola oil. The resultant enteric coated product was called CYR-155

1400 g of CYR-155 were coated in a fluid bed coater with a 1400 g melted hydrogenated palm oil. The resultant lipid coated product was called CYR-162.

1000 g of CYR-162 were coated in a fluid bed coater with a solution made from 600 g acetone, 70 g isopropanol, 10 g canola oil and 100 g ethylcellulose.

The resultant protected Cyromazine formulation, named CYR234, was used in experimental examples presented below.

Example 12

Non-Granulated Non-Encapsulated Cyromazine

In order to provide a control Cyromazine preparation non granulated non encapsulated Cyromazine was purchased as 100% Cyromazine powder and used "as is" in experimental examples presented below.

Example 13

Feeding Trial

In order to evaluate CYR234 against a conventional commercially available Cyromazine preparation (LARVADEX) a feeding trial was conducted.

Twenty four Lohman laying hens were placed in conventional layer cages (2 birds per cage) and divided into 6 experimental groups of 4 birds per group.

The hens were fed for three weeks with laying hens feed (17.5% protein, no AGP) supplemented with a Cyromazine product as summarized in Table 12.

These hens served as a source of manure and eggs for examples presented hereinbelow.

TABLE 12

Experimental treatment groups

| Group | Name | premix (g)/ton feed | Cyromazine in feed (PPM) |
|---|---|---|---|
| A | Negative Control | NA | 0 |
| B | LARVADEX 0.5% | 1000 | 5 |
| C | CYR234 | 455 | 5 |
| D | CYR234 | 227.3 | 2.5 |
| E | CYR234 | 136.4 | 1.5 |
| F | *NGNEC | 5 | 5 |

*Non Granulated Non Encapsulated Cyromazine

Example 14

Insecticidal Activity in Manure

In order to compare the relative insecticidal activity in the different treatment groups, samples of manure were collected and incubated with controlled amounts of fly larva.

After three weeks of feeding according to the experimental groups of example 3, manure was collected from each group of hens. The manure was frozen for 48 hours to destroy any insects present and then thawed.

For each experimental group, 5 cups containing 100 g thawed manure were prepared (70-75% moisture). Each cup represents a group replicate.

Thirty young fly larvae (stage 1) were placed in each cup and incubated in an insectarium for 10 days. After ten days the pupae/larvae/flies were counted. Results are summarized in Table 2. Analysis of variance was done using a One Way Anova test and the comparison of means was done with Tukey-Kramer test, significance level-$\alpha$=0.05.

TABLE 13

Percentage of adult flies, pupae, larvae dead / normal

| Treatment | Flies % | Dead larvae and pupas % | Normal pupa % | *Survival rate |
|---|---|---|---|---|
| Neg Con | $10^a$ | 0 | $78^a$ | $88^a$ |
| LARVADEX 0.5% | $0^b$ | 0 | $0^b$ | $0^b$ |
| CYR234 5 ppm | $0^b$ | 0 | $0^b$ | $0^b$ |
| CYR234 2.5 ppm | $0^b$ | 0 | $0^b$ | $0^b$ |
| CYR234 1.5 ppm | $0^b$ | 0.83 | $0.83^b$ | $0.83^b$ |
| NGNEC | $0^b$ | 0 | $0^b$ | $0^b$ |
| P value ($\alpha$ < 0.05) | <0.001 | 0.4984 | <0.001 | <0.001 |

*Survival rate = (No of flies + normal pupas)/30*100

Results summarized in Table 13 confirm the efficacy of Cyromazine as an insecticide. The negative control group showed 88% survival compared to 0-0.83% in the Cyromazine-treated groups. The Non-Granulated Non-Encapsulated Cyromazine (NGNEC) group had 0% survival at a dose of 5 ppm similar to the positive control (LARVADEX) group.

As expected, LARVADEX 0.5% and CYR234 at a dose of 5 ppm each provided 0% fly survival.

Superiority of CYR234 with respect to LARVADEX was demonstrated at 2.5 ppm Cyromazine (0% survival) and 1.5 ppm Cyromazine (0.83% survival). In other words, even at 30% of the Cyromazine concentration routinely used for a conventional formulation, the protected formulation inhibited the development of flies. This inhibition was not significantly different from LARVADEX at the accepted concentration of 5 ppm.

These results suggest that protected formulations according to various exemplary embodiments of the invention can be used at significantly lower concentrations in animal feed without sacrificing insecticidal activity in manure.

Example 15

Cyromazine Residue in Eggs

In order to see whether protected formulations according to various exemplary embodiments of the invention can contribute to a reduction in Cyromazine residues in eggs, eggs from the different experimental groups were harvested and assayed for Cyromazine content.

After four weeks of feeding according to the experimental groups of example 13, eggs were collected.

For each treatment 16 eggs were collected (4 eggs from each hen). The contents of the 4 eggs (without the shell) of each bird were pooled in one container marked to indicate the treatment. Each container was a sample. A total of 4 tests were performed for each treatment. The containers were packed in a temperature-controlled pack that was sent for Cyromazine analysis to Eurofines laboratory in Germany.

Cyromazine analysis was conducted as follows:

Samples are weighed and one or more samples is spiked with an internal standard.

Acetonitrile is added and the sample is vortexed. Petroleum ether is added and a liquid/liquid extraction is performed in a shaker followed by centrifugation. An aliquot of the acetonitrile phase is removed and reduced in volume to near dryness then resolved by adding water and methanol. The mixture is vortexed then filtered by membrane filter and analyzed—Liquid chromatographic determination with LC-MS/MS. Quantitation is via comparison with samples spiked with an internal standard.

Results presented in Table 14 show the effect of treatment group on amount of Cyromazine in eggs.

Results presented in Table 14 indicate that the amount of Cyromazine in eggs in the LARVADEX 0.5% group was not significantly different from that found in the NGNEC group. This indicates that the Cyromazine that was used in preparation CYR234 acts in the body like the referent product LARVADEX.

TABLE 14

The Average amount of Cyromazine in eggs by treatment:

| Treatment | mg/Kg Cyromazine | % of Larvadex 0.5% group |
|---|---|---|
| Negative Control | $<0.010^c$ | 12% |
| Larvadex 0.5% | $0.086^a$ | 100% |
| CYR234 5 ppm | $0.065^b$ | 76% |
| CYR234 2.5 ppm | $0.026^c$ | 30% |
| CYR234 1.5 ppm | $0.017^c$ | 20% |
| NGNEC | $0.088^a$ | 102% |
| P value ($\alpha$ < 0.05) | <0.0001 | |

Results presented in Table 14 also indicate that hens fed CYR234 at a concentration of 5 PPM deposited significantly less Cyromazine in eggs than hen fed LARVADEX 5 PPM or NGNEC 5 PPM. NGNEC is powdered, LARVADEX is granulated and CYR234 is granulated and encapsulated. Thus, results summarized in Table 14 indicate that coating in combination with granulation (CYR234) significantly reduced (24%) the amount of Cyromazine in the eggs relative to granulation alone (LARVADEX).

Results presented in Table 14 also indicate that the amount of Cyromazine found in eggs increased as the concentration of CYR234 in the feed increased. The group fed CYR234 at 1.5 ppm was the lowest (0.017) which is 80% lower than birds fed a conventional diet containing LARVADEX at a 5 PPM Cyromazine concentration. The European MRL (maximum residue level) for Cyromazine in eggs is 0.01 mg/kg.

Figure 4:
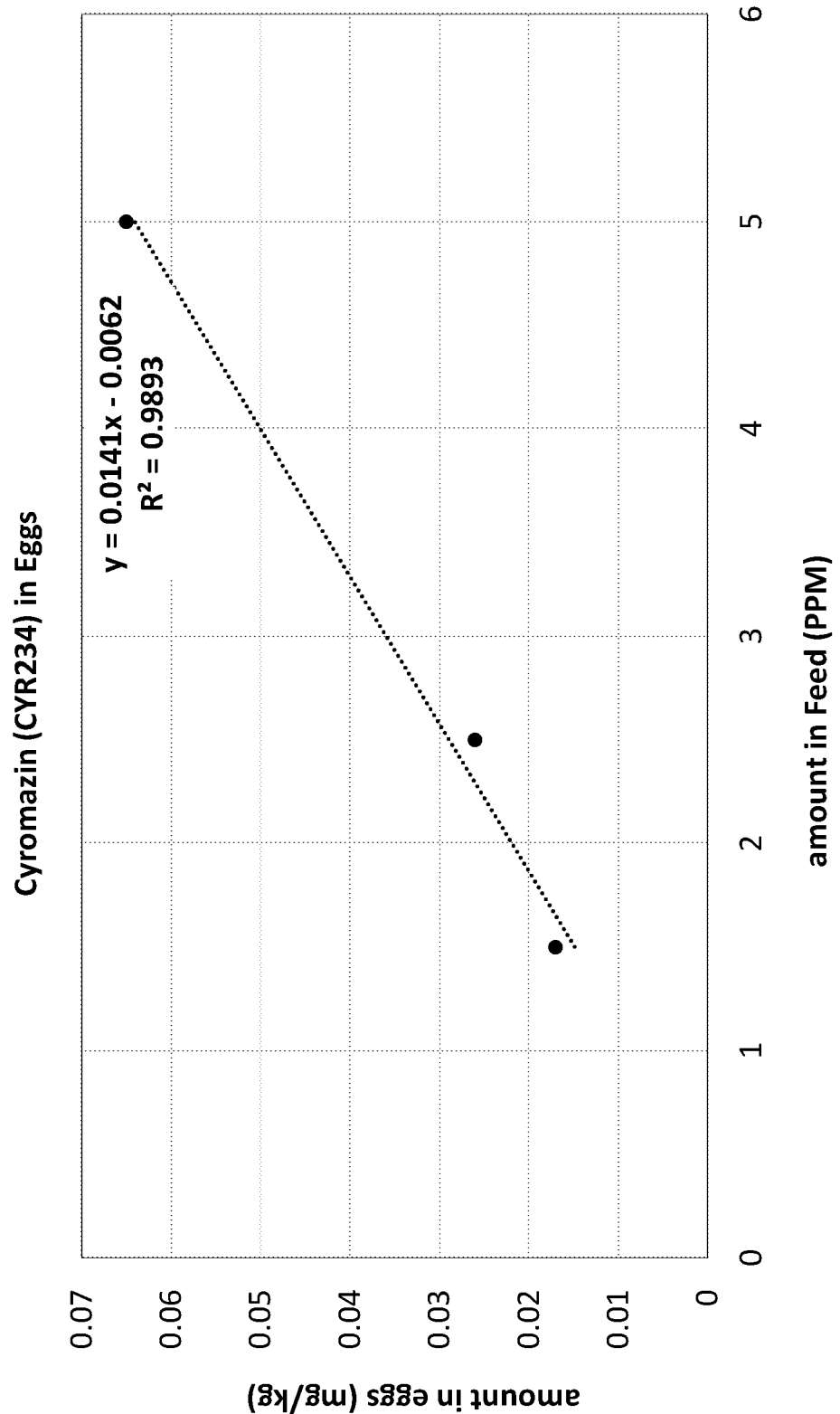

FIG. 4 is a plot of Cyromazine concentration in eggs (mg/kg) as a function of Cyromazine concentration in feed (PPM). FIG. 4 demonstrates that there is a good correlation ($R^2$=0.9893) between the amount of Cyromazine given in feed as CYR234 and that found in eggs. Based on this correlation coefficient, it can be assumed that a reduction in the amount of Cyromazine in the feed to approx. 1.2 ppm will lead to Cyromazine residues in eggs below the European MRL. This conclusion needs to be investigated also in terms of insecticidal activity.

Results presented hereinabove in examples 6 through 15 suggest that similar coatings can be employed with other IGRs and/or other LCIA to achieve a similar effect.

Example 16

Insecticidal Activity in Manure of CYR349(cyr234) and CYR348(cyr162) Reduced Dose Trial Previous trials with coated Cyromazine showed effectiveness of coating in delaying the release of the Cyromazine in the layers digestive system. Two products were tested: CYR234 (1.1%) and CYR162 (1.26%). The difference between those products is an additional coating layer at CYR234. Both CYR 234 and CYR 162 were tested at 5 ppm Cyromazine dose and CYR234 was tested also at 1.5 ppm. CYR234 at 1.5 ppm resulted in 0.67% fly's survival, and the residual Cyromazine level in the eggs was 0.017 mg/kg, which is close to European MRL (0.001 mg/kg).

Experimental Design

In order to evaluate the lowest effective larvacidial dose of CYR349 [CYR234] and CYR348 [CYR162] a feeding trial was conducted using 156 Lohman laying hens placed in conventional layer cages (2 birds per cage) and divided into 13 experimental groups of 12 birds per group.

The hens were fed for three weeks with laying hen feed (17.5% protein, no AGP) as detailed in Table 15:

TABLE 15

Experimental treatment groups:

| Treatment | Desc. | Cyromazine ppm | Dose per 1000 kg of feed |
|---|---|---|---|
| A | Larvadex 0.5% | 5 | 1000 |
| B | | 1.5 | 300 |
| C | | 1 | 200 |
| D | CYR348, | 1.5 | 107 |
| E | 1000 1.4% | 1.3 | 93 |
| F | | 1 | 71 |
| G | CYR349, | 1.5 | 126 |
| H | 1000 1.19% | 1.3 | 109 |
| I | | 1 | 84 |
| J | CYR349 | 1.5 | 122 |
| K | MIX, 1.23% | 1.3 | 106 |
| L | | 1 | 81 |
| M | Neg. Con | — | |

Groups A, B, and C are control groups for the other groups to demonstrate that the coating does not adversely influence Cyromazine activity. This is apparent from the larvacidal effect data presented below.

Trial Method:

In order to compare the relative insecticidal activity in the different treatment groups, samples of manure were collected and incubated with controlled amounts of fly larva. After three weeks of feeding according to the experimental groups (Table 15), manure was collected from each group of birds. The manure was frozen for 4 days to destroy any insects present and then thawed.

For each experimental group, 5 cups containing 100 g thawed manure were prepared (70-80% moisture). Each cup represents a group replicate (n=5). Thirty young fly larvae (stage 1) were placed in each cup and incubated in an insectarium for 7 days. After seven days the pupae/larvae/flies were counted. Results are summarized in Table 16. Analysis of variance was done using a One Way Anova test and the comparison of means was done with Tukey-Kramer test, significance level-$\alpha$=0.05.

Results summarized in Table 16 confirm that even at the lowest Cyromazine dose (1 ppm) the tested products are efficient in controlling larvae development (maximum survival rate—2%). CYR348 and CYR 349 appear equally effective. Particles size of CYR349 did not appear to influence survival rate.

The survival rate of the negative control (M) was 62% which was lower than the expected, nonetheless the corrected survival rates were still significantly lower than the control (the maximum corrected survival rate was 3.2% at CYR349 in 1 ppm and 1000 μM).

In summary, these results indicate that a 1 ppm Cyromazine dose of CYR349 or CYR348 in feed is effective in controlling the development of fly larvae in resultant waste.

In addition, these results indicate that the coating protects the Cyromazine in the birds body so that it passes through undigested and is released in the waste. The level of protection is high enough that even 1 ppm Cyromazine in feed provides larvicidal activity in the waste.

TABLE 16 larvae/pupa survival rate by treatment group

| Group | Treatment Desc. | Cyromazine ppm | Live larvae/pupae (Mean) | Dead larve/pupae (Mean) | % Survival* (Mean) | Corrected survival (Mean)** | Live larvae/pupae (SD) | Dead larave/pupae (SD) |
|---|---|---|---|---|---|---|---|---|
| A | Larvadex 0.5% | 5 | $0^b$ | $0^c$ | $0.0^b$ | 0 | 0.0 | 0.0 |
| B | | 1.5 | $0.2^b$ | $0.4^{bc}$ | $0.7^b$ | 1.13 | 0.4 | 0.5 |
| C | | 1 | $0^b$ | $0.4^{bc}$ | $0.0^b$ | 0 | 0.0 | 0.5 |
| D | CYR348, | 1.5 | $0^b$ | $0^c$ | $0.0^b$ | 0 | 0.0 | 0.0 |
| E | 1000 1.4% | 1.3 | $0.4^b$ | $1.8^a$ | $1.3^b$ | 2.1 | 0.5 | 0.8 |
| F | | 1 | $0^b$ | $0.8^{abc}$ | $0^b$ | 0 | 0 | 0.4 |
| G | CYR349, | 1.5 | $0.4^b$ | $0.2^{bc}$ | $1.3^b$ | 2.1 | 0.9 | 0.4 |
| H | 1000 1.19% | 1.3 | $0^b$ | $0.4^{bc}$ | $0.0^b$ | 0 | 0.0 | 0.5 |
| I | | 1 | $0.6^b$ | $1.4^{ab}$ | $2.0^b$ | 3.23 | 0.5 | 1.1 |
| J | CYR349 MIX, | 1.5 | $0^b$ | $0^c$ | $0.0^b$ | 0 | 0.0 | 0.0 |
| K | 1.23% | 1.3 | $0^b$ | $0.6^{bc}$ | $0.0^b$ | 0 | 0.0 | 0.9 |
| L | | 1 | $0.2^b$ | $0.6^{bc}$ | $0.7^b$ | 1.13 | 0.4 | 0.5 |
| M | — | Neg. Con | $18.6^a$ | $0^c$ | $62.0^a$ | — | 4.9 | 0.0 |
| | | Pval | <0.0001 | <0.0001 | <0.0001 | 0.5386 | | |

*Survival rate= normal pupas/30*100
**corrected survival rate = group survival/Neg. Con survival*100

The invention claimed is:

1. An in-feed life cycle interruption agent (LCIA) comprising:
   (a) a granulated core comprising at least one active ingredient selected from the group consisting of saponin and cyromazine; and
   (b) a coating on said granulated core, the coating (i) protects said active ingredient from inactivation during passage through the entire digestive tract; and (ii) comprises an enteric coating, the enteric coating has at least one member selected from the group consisting of hydroxypropyl methylcellulose phthalate (HP-55), Stearic acid, Zein, cellulose acetate phthalate, cellulose acetate succinate, methacrylic polymer, shellac, and alginate.

2. The in-feed LCIA according to claim 1, wherein said coating comprises an enteric coating, the enteric coating protects said active ingredient from inactivation as the in-feed LCIA passes through the digestive tract, the enteric coating has at least one member selected from the group consisting of hydroxypropyl methylcellulose phthalate (HP-55), Stearic acid, Zein, cellulose acetate phthalate, cellulose acetate succinate, methacrylic polymer, shellac, and alginate.

3. The in-feed LCIA according to claim 2, wherein said enteric coating comprises at least one member selected from the group consisting of hydroxypropyl methylcellulose phthalate (HP-55) and stearic acid.

4. The in-feed LCIA according to claim 1, further comprising;
   an additional coating that protects said active ingredient from inactivation in a rumen, the additional coating is selected from the group consisting of fat, wax, hard oil, palm oil, palm kernel oil, coconut oil, rape seed oil, sunflower oil, corn oil, castor oil, Cocoa butter, Shea butter, butter, animal fat, and hydrogenated vegetable oils, cellulose derivatives, ethyl cellulose, cellulose acetate, ethyl acrylate, methyl methacrylate, and zein.

5. The in-feed LCIA according to claim 1, wherein said granulated core further comprises one or more members selected from the group consisting of silica, microcrystalline cellulose, sugar, starch, calcium salts and other inert materials.

6. The in-feed LCIA according to claim 1, wherein said active ingredient comprises saponin.

7. The in-feed LCIA according to claim 6, wherein said saponin comprises *Yucca* derived material.

8. The in-feed LCIA according to claim 1, wherein said active ingredient comprises cyromazine.

* * * * *